United States Patent
Xia et al.

(10) Patent No.: US 11,039,432 B2
(45) Date of Patent: *Jun. 15, 2021

(54) CONTROL CHANNEL RESOURCE TRANSMISSION METHOD, USER EQUIPMENT AND BASE STATION

(71) Applicant: HUAWEI TECHNOLOGIES CO., LTD., Guangdong (CN)

(72) Inventors: Liang Xia, Shenzhen (CN); Mingyu Zhou, Shenzhen (CN); Chi Gao, Shenzhen (CN); Zhenfei Tang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/855,156

(22) Filed: Apr. 22, 2020

(65) Prior Publication Data

US 2020/0252921 A1 Aug. 6, 2020

Related U.S. Application Data

(63) Continuation of application No. 16/041,215, filed on Jul. 20, 2018, now Pat. No. 10,674,496, which is a
(Continued)

(30) Foreign Application Priority Data

Mar. 16, 2012 (CN) .......................... 201210071085.3

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0094* (2013.01); *H04W 8/06* (2013.01);
(Continued)

(58) Field of Classification Search
CPC ..... H04W 72/042; H04W 8/06; H04W 28/18; H04L 5/0094; H04L 5/0023; H04L 5/0053
See application file for complete search history.

(56) References Cited

U.S. PATENT DOCUMENTS 9,337,984 B2 * 5/2016 Kim ...................... H04L 5/0055
9,756,623 B2 9/2017 Seo
(Continued)

FOREIGN PATENT DOCUMENTS

CN 101478808 A 7/2009
CN 101541063 A 9/2009
(Continued)

OTHER PUBLICATIONS

3GPP TS 36.213 V9.3.0 (Sep. 2010), 3rd Generation Partnership Project;Technical Specification Group Radio Access Network;Evolved Universal Terrestrial Radio Access (E-UTRA);Physical layer procedures(Release 9), 80 pages.
(Continued)

*Primary Examiner* — Michael J Moore, Jr.
(74) *Attorney, Agent, or Firm* — Leydig, Voit & Mayer, Ltd.

(57) ABSTRACT

In a control channel resource transmission method, user equipment (UE) obtains a configuration parameter in a candidate control channel set according to a preset protocol and/or higher-layer signaling sent by a base station, where the higher-layer signaling is used to notify the configuration parameter. The UE determines an antenna port according to the obtained configuration parameter, and then receives,
(Continued)

```
┌─────────────────────────────────────────────────┐
│ A user equipment obtains a configuration        │
│ parameter in a candidate control channel set    │── S101
│ according to a preset protocol and/or           │
│ higher-layer signaling sent by a base station   │
└─────────────────────────────────────────────────┘
                      │
                      ▼
┌─────────────────────────────────────────────────┐
│ The user equipment determines an antenna port   │── S102
│ according to the obtained configuration         │
│ parameter                                       │
└─────────────────────────────────────────────────┘
                      │
                      ▼
┌─────────────────────────────────────────────────┐
│ The user equipment receives, by using the       │── S103
│ antenna port, a control channel or a control    │
│ channel element sent by the base station        │
└─────────────────────────────────────────────────┘
``` through the antenna port, a control channel or a control channel element sent by the base station. The base station determines the antenna port according to the same configuration parameter as that of the user equipment, and sends, by using the antenna port, the control channel or the control channel element to the user equipment.

20 Claims, 5 Drawing Sheets

Related U.S. Application Data continuation of application No. 15/432,652, filed on Feb. 14, 2017, now Pat. No. 10,064,172, which is a continuation of application No. 14/487,980, filed on Sep. 16, 2014, now Pat. No. 9,609,642, which is a continuation of application No. PCT/CN2012/083970, filed on Nov. 2, 2012.

(51) Int. Cl.
  H04W 8/06 (2009.01)
  H04W 28/18 (2009.01)
(52) U.S. Cl.
  CPC ......... H04L 5/0023 (2013.01); H04L 5/0053 (2013.01); H04W 28/18 (2013.01)

(56) References Cited

U.S. PATENT DOCUMENTS

| | | | |
|---|---|---|---|
| 9,867,176 | B2 | 1/2018 | Li et al. |
| 10,064,172 | B2* | 8/2018 | Xia ..................... H04W 72/042 |
| 10,674,496 | B2* | 6/2020 | Xia ..................... H04W 72/042 |
| 10,904,869 | B2* | 1/2021 | Nayeb Nazar .... H04W 72/0413 |
| 2007/0244657 | A1 | 10/2007 | Drago et al. |
| 2010/0080187 | A1 | 4/2010 | Papasakellariou et al. |
| 2011/0222485 | A1 | 9/2011 | Nangia et al. |
| 2011/0235599 | A1 | 9/2011 | Nam et al. |
| 2011/0269492 | A1 | 11/2011 | Wang |
| 2012/0057562 | A1 | 3/2012 | Kim et al. |
| 2012/0207119 | A1 | 8/2012 | Zhang et al. |
| 2013/0039284 | A1 | 2/2013 | Marinier et al. |
| 2013/0044727 | A1 | 2/2013 | Nory et al. |
| 2013/0058285 | A1 | 3/2013 | Koivisto et al. |
| 2013/0064196 | A1 | 3/2013 | Gao et al. |
| 2013/0064216 | A1 | 3/2013 | Gao et al. |
| 2013/0100901 | A1 | 4/2013 | Shan et al. |
| 2013/0114565 | A1 | 5/2013 | Chen et al. |
| 2013/0121304 | A1 | 5/2013 | Nory et al. |
| 2013/0142149 | A1 | 6/2013 | Malladi |
| 2013/0215842 | A1 | 8/2013 | Han et al. |
| 2014/0314018 | A1* | 10/2014 | Gao ..................... H04L 5/0051 370/329 |
| 2014/0348126 | A1 | 11/2014 | Seo et al. |
| 2015/0003365 | A1 | 1/2015 | Seo |
| 2015/0003393 | A1 | 1/2015 | Xia et al. |

FOREIGN PATENT DOCUMENTS

| | | |
|---|---|---|
| CN | 101764642 A | 6/2010 |
| CN | 101790190 A | 7/2010 |
| CN | 101860896 A | 10/2010 |
| CN | 101969337 A | 2/2011 |
| CN | 101998509 A | 3/2011 |
| CN | 102035804 A | 4/2011 |
| CN | 102056185 A | 5/2011 |
| CN | 102076055 A | 5/2011 |
| CN | 102076076 A | 5/2011 |
| CN | 102164372 A | 8/2011 |
| CN | 102264135 A | 11/2011 |
| CN | 102420644 A | 4/2012 |
| CN | 103313404 A | 9/2013 |
| EP | 2584731 A2 | 4/2013 |
| EP | 2819477 A1 | 12/2014 |
| JP | 2015501586 A | 1/2015 |
| KR | 20110007977 A | 1/2011 |
| RU | 2414085 C2 | 3/2011 |
| WO | 2013058624 A1 | 4/2013 |

OTHER PUBLICATIONS

3rd Generation Partnership Project; Technical Specification Group Radio AccessNetwork; Evolved Universal Terrestrial Radio Access (E-UTRA); Physical Channels andModulation (Release 10), 3GPP TS 36.211, vol. 10.4.0, pp. 1-101, 3rd GenerationPartnership Project, Valbonne, France (Dec. 2011).
3rd Generation Partnership Project; Technical Specification Group Radio AccessNetwork; Evolved Universal Terrestrial Radio Access (E-UTRA); Physical layerprocedures (Release 10),3GPP TS 36.213, vol. 10.5.0, pp. 1-125, 3rd GenerationPartnership Project, Valbonne, France (Mar. 2012).
R1-120507 Alcatel-Lucent et al.,"Further details of ePDCCH UE-specific search space design",3GPP TSG RAN WG1 Meeting #68,Dresden, Germany, Feb. 6-10, 2012,total 5 pages. XP050563228.
R1-120279 Sharp,"Configuration of UE-specific RS for ePDCCH",3GPP TSG RAN WG1 Meeting #68,Dresden, Germany, Feb. 6-10, 2012,total 7 pages. XP050562818.
R1-120616 Potevio,"Considerations on reference signals for E-PDCCH",3GPP TSG RAN WG1 meeting #68,Dresden, Germany, Feb. 6-10, 2012,total 4 pages. XP050563031.

* cited by examiner

CONTROL CHANNEL RESOURCE TRANSMISSION METHOD, USER EQUIPMENT AND BASE STATION

CROSS-REFERENCE TO RELATED APPLICATION

This application is a continuation of U.S. patent application Ser. No. 16/041,215, filed on Jul. 20, 2018, which is a continuation of U.S. patent application Ser. No. 15/432,652, filed on Feb. 14, 2017, now U.S. Pat. No. 10,064,172. U.S. patent application Ser. No. 15/432,652 is a continuation of U.S. patent application Ser. No. 14/487,980, filed on Sep. 16, 2014, now U.S. Pat. No. 9,609,642. U.S. patent application Ser. No. 14/487,980 is a continuation of International Patent Application No. PCT/CN2012/083970, filed on Nov. 2, 2012 and claiming priority to Chinese Patent Application No. 201210071085.3, filed on Mar. 16, 2012. All of the afore-mentioned patent applications are hereby incorporated by reference in their entirety.

TECHNICAL FIELD

The present invention relates to the communications field, and in particular, to a control channel resource transmission method, a user equipment, and a base station.

BACKGROUND

In downlink transmission of a Long Term Evolution (LTE) Rel-8/9/10 communications system, a base station such as an evolved Node Base (eNB) sends a physical downlink shared channel (PDSCH) and a corresponding physical downlink control channel (PDCCH) to each scheduled user equipment according to a scheduling result.

The PDSCH carries data sent by the eNB to the scheduled user equipment, and the PDCCH carries scheduling information of the corresponding PDSCH. The scheduling information includes physical channel resources allocated to the UE, information about a modulation and coding scheme (MCS) that is specifically used, and the like. In a subframe, the PDCCHs of all scheduled user equipments are multiplexed together, and are then sent in a PDCCH region, and the PDSCH is sent in a PDSCH region. Each PDCCH is formed by 1/2/4/8 control channel elements (CCE). In a further evolution of the LTE Rel-10 system, MU-MIMO (Multiple User Multiple Input Multiple Output) and coordination between multiple cells need to be supported to improve system performance. These technologies lead to an increase in a quantity of simultaneously scheduled user equipments. However, the PDCCH has a limited capacity, which restricts a quantity of user equipments that can be scheduled by one subframe. Therefore, the PDCCH is enhanced in the prior art, that is, some resources are separated from the original PDSCH region to transmit an enhanced PDCCH, that is, enhanced-physical downlink control channel (E-PDCCH). Meanwhile, the UE can demodulate the E-PDCCH based on a demodulation reference signal (DMRS), which increases the capacity of the PDCCH and the quantity of simultaneously scheduled user equipments. Each E-PDCCH is formed by 1/2/4/8 logical elements similar to CCEs, where the logical elements are referred to as enhanced-control channel elements (E-CCEs).

In the prior art, after the E-PDCCH is sent, the user equipment uses the DMRS to perform channel estimation, and demodulates the E-PDCCH. In this case, the base station needs to use the PDCCH to dynamically notify the user equipment of a DMRS antenna port number that needs to be used. However, if the subframe that carries the E-PDCCH has no PDCCH, the user equipment is unable to obtain the DMRS antenna port number that is used to demodulate and receive the E-PDCCH.

SUMMARY

Embodiments of the present invention provide a control channel resource transmission method, a user equipment, and a base station, which can enable the user equipment to determine an antenna port according to an obtained parameter, thereby ensuring that the user equipment can correctly demodulate and receive a control channel or a control channel element sent by the base station.

To achieve the foregoing objectives, the following technical solutions are used in the embodiments of the present invention:

According to one aspect, a control channel resource transmission method is provided, including:

obtaining a configuration parameter in a candidate control channel set according to a preset protocol and/or higher-layer signaling sent by a base station, where the higher-layer signaling is used to notify the configuration parameter;

determining an antenna port according to the configuration parameter; and receiving, by using the antenna port, a control channel or a control channel element sent by the base station.

According to one aspect, a control channel resource transmission method is provided, including:

obtaining a configuration parameter in a candidate control channel set according to a preset protocol and/or higher-layer signaling sent to a user equipment, where the higher-layer signaling is used to notify the configuration parameter;

determining an antenna port according to the obtained configuration parameter; and sending, by using the antenna port, a control channel or a control channel element to the user equipment.

According to another aspect, a user equipment is provided, including:

a first obtaining unit, configured to obtain a configuration parameter in a candidate control channel set according to a preset protocol and/or higher-layer signaling sent by a base station, where the higher-layer signaling is used to notify the configuration parameter;

a first determining unit, configured to determine an antenna port according to the configuration parameter obtained by the obtaining unit; and a first receiving unit, configured to receive, by using the antenna port determined by the determining unit, a control channel or a control channel element sent by the base station.

According to another aspect, a base station is provided, including:

a first obtaining unit, configured to obtain a configuration parameter in a candidate control channel set according to a preset protocol and/or higher-layer signaling sent to a user equipment, where the higher-layer signaling is used to notify the configuration parameter;

a first determining unit, configured to determine an antenna port according to the configuration parameter obtained by the first obtaining unit; and a first sending unit, configured to send, by using the antenna port determined by the first determining unit, a control channel or a control channel element to the user equipment.

In a control channel resource transmission method, a user equipment, and a base station provided in the embodiments of the present invention, the user equipment obtains a configuration parameter in a candidate control channel set according to a preset protocol or higher-layer signaling sent by the base station, determines an antenna port according to the configuration parameter, and receives, by using the antenna port, a control channel or a control channel element sent by the base station, and the base station uses the same method to determine the antenna port, and sends the control channel or the control channel element to the user equipment by using the antenna port. In this way, different from the prior art, in which the base station needs to use a PDCCH to notify the user equipment to obtain the antenna port, the embodiments of the present invention enable each user equipment to determine, by using a corresponding parameter, the antenna port, and to send and receive the control channel or the control channel element by using the determined antenna port. This ensures that the user equipment can correctly demodulate and receive the control channel or the control channel element sent by the base station.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
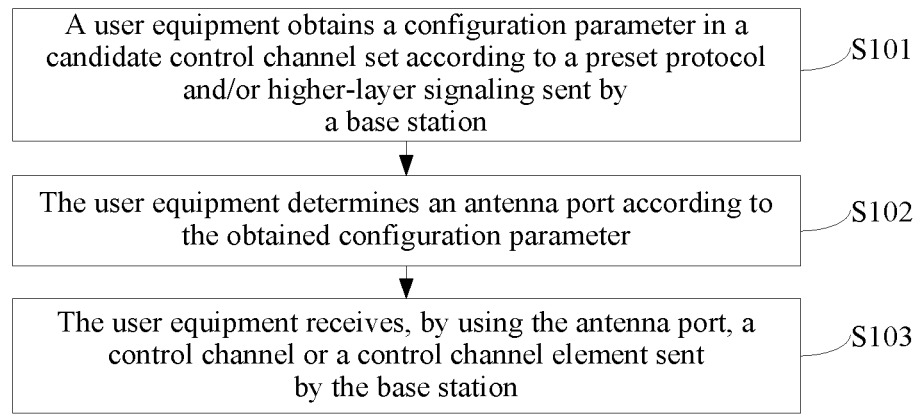
FIG. 1 is a schematic flowchart of a control channel resource transmission method according to an embodiment of the present invention.

An embodiment of the present invention provides, a control channel resource transmission method. As shown in FIG. 1, the method includes the following steps:

S101. A user equipment obtains a configuration parameter in a candidate control channel set according to a preset protocol and/or higher-layer signaling sent by a base station.

The higher-layer signaling is used to notify the configuration parameter.

It should be noted that the preset protocol may be an existing well-known protocol such as an LTE protocol, or a protocol that is newly set according to configuration conditions of the base station and the user equipment. The preset protocol is known to both the base station and the user equipment, and is uniformly determined before resource transmission is performed.

Preferably, this embodiment of the present invention is described by assuming that a control channel includes an E-PDCCH and a control channel element includes an E-CCE, which, however, shall not be construed as any limitation.

The control channel element may be a CCE (Control Channel Element, control channel element) of a PDCCH in an existing LTE system, or the control channel element may be measured by using another unit, such as an RB (Resource Block, resource block), a half RB, or a control channel element of another size, which is not limited herein.

Further, the configuration parameter may be known to both the base station and the user equipment, and uniformly determined before the resource transmission is performed. For example, the user equipment may obtain an aggregation level in the candidate control channel set according to the preset protocol, where the aggregation level is denoted by L. L=1 corresponds to a location of a first E-CCE of search space. The aggregation level is preselected. Here the aggregation level L=1 is applied. The location of the E-CCE in the search space may be a preselected $N^{th}$ E-CCE, where N is predefined as being smaller than or equal to a total quantity of E-CCEs, for example, the first E-CCE. For another example, the user equipment may also obtain a sequence number of an E-PDCCH in the search space corresponding to an aggregation level L=4.

It is worth pointing out that the search space corresponding to L includes one or more E-PDCCHs. Each E-PDCCH includes L E-CCEs, the E-PDCCH allocated by the base station to the user equipment is one or more of the foregoing E-PDCCHs, and L=1, 2, 4 or another value. The foregoing is only intended to enumerate two scenarios of configuration parameters, which, however, shall not be construed as any limitation.

Further, the base station may also notify the user equipment of the configuration parameter by using the higher-layer signaling. For example, the user equipment may use the higher-layer signaling to obtain the aggregation level in the candidate control channel set, where the aggregation level is denoted by L; for another example, the user equipment may further use the higher-layer signaling to obtain a quantity of E-PDCCHs in the search space corresponding to the aggregation level L=4; and, for another example, the user equipment may use the higher-layer signaling to obtain a location of a physical channel resource corresponding to the candidate control channel set. The foregoing is only intended to enumerate two scenarios of configuration parameters, which, however, shall not be construed as any limitation.

S102. The user equipment determines an antenna port according to the obtained configuration parameter.

Further, the base station needs to predefine a mapping relationship between the location of the E-CCE and the antenna port, so as to ensure that the mapping relationship between the location of the E-CCE and the antenna port, which is learnt by the user equipment, is consistent with that of the base station.

It should be noted that the location of the E-CCE refers to a location of a physical channel resource occupied by the E-CCE. Specifically, the physical channel resource may be divided into multiple RB pairs (Resource Block pair, resource block pairs), and each resource block pair may carry one or more E-CCEs. The location of the E-CCE may be the location of the physical channel resource, which is occupied by the E-CCE, in the resource block pair, or may be the location of the physical channel resource, which is occupied by the E-CCE, in all physical channel resources.

Exemplarily, the configuration parameter may be a location of an $N^{th}$ control channel element in search space corresponding to an aggregation level in the candidate control channel set, or a location of an $N^{th}$ control channel element on a control channel in search space corresponding to an aggregation level in the candidate control channel set.

Preferably, if the location of the first E-CCE in the search space corresponding to the aggregation level L=1 corresponds to a sequence number 0, the user equipment determines that the antenna port is 7; if the location of the first E-CCE in the search space corresponding to L=1 corresponds to a sequence number 1, the user equipment determines that the antenna port is 8, where a reference signal antenna port 7 and a reference signal antenna port 8 are antenna ports that are mutually orthogonal and pseudo-orthogonal, which may be specifically expressed by the following formula:

$$Port_{DMRS}=[Index_{firstE-CCE}(L=1,m=0)\bmod 4]+7$$

where $Port_{DMRS}$ denotes a reference signal antenna port number, L denotes the aggregation level, m denotes an $m^{th}$ E-PDCCH in the search space corresponding to the aggregation level L=1, $Index_{firstE-CCE}$ (L=1, m=0) denotes a sequence number of a first E-CCE in a $0^{th}$ E-PDCCH in the search space corresponding to the aggregation level L=1, mod denotes a modulo operation, 7 denotes a start sequence number of the reference signal antenna port, where m≥0, L∈{1, 2, 4, or another value}, such as L∈{1, 2, 4, 8}.

Alternatively, the user equipment determines the reference signal antenna port according to the location of the first E-CCE in the search space corresponding to the aggregation level L=1 in a preselected channel set. A mapping relationship between the location of the E-CCE and the reference signal antenna port needs to predefined, so as to ensure that the mapping relationship between the location of the E-CCE and the reference signal antenna port, which is learnt by the user equipment, is consistent with that of the base station.

Alternatively, the user equipment may also determine the antenna port according to the location of the first E-CCE in the $m^{th}$ E-PDCCH in the search space corresponding to the aggregation level L=1 in the candidate control channel set. The mapping relationship between the location of the first E-CCE and the antenna port needs to predefined, so as to ensure that the mapping relationship between the location of the E-CCE and the antenna port, which is obtained by the user equipment and used as a basis for calculation, is consistent with that of the base station, which, for example, may be expressed by the following formula:

$$Port_{DMRS}=[Index_{firstE-CCE}(L=1,m)\bmod 4]+7$$

where $Index_{firstE-CCE}$(L=1,m) denotes a sequence number of the first E-CCE in the $m^{th}$ E-PDCCH in the search space corresponding to the aggregation level L=1.

Alternatively, the user equipment may determine the reference signal antenna port according to the location of the first E-CCE in the search space corresponding to the aggregation level L in the candidate control channel set, which may be expressed by the following formula:

$$Port_{DMRS}=[Index_{firstE-CCE}(L,m=0)\bmod 4]+7$$

where $Index_{firstE-CCE}$ (L, m=0) denotes a sequence number of the first E-CCE in the $m^{th}$ E-PDCCH in the search space corresponding to the aggregation level L.

Still alternatively, the user equipment determines the reference signal antenna port according to the location of the first E-CCE in the $m^{th}$ E-PDCCH in the search space corresponding to the aggregation level L in the candidate control channel set, which, for example, may be expressed by the following formula:

$$Port_{DMRS}=[Index_{firstE-CCE}(L,m)\bmod 4]+7$$

where $Index_{firstE-CCE}$(L, m) denotes a sequence number of the first E-CCE in the $m^{th}$ E-PDCCH in the search space corresponding to the aggregation level L.

It should be noted that the aggregation level L=1 enumerated in the foregoing method is only an example, and the aggregation level may also be L=2 or 4 or 8 or another value; the location of the first E-CCE in the search space enumerated in the method may also be the location of the second or another E-CCE in the search space; the sequence number obtained according to the location of the first E-CCE in the method may be a sequence number of an E-CCE used for E-PDCCH transmission in an entire subframe, or may be a sequence number of an E-CCE used for transmission of an E-PDCCH sent in a precoding manner in an entire subframe, or may be a sequence number of an E-CCE used for E-PDCCH transmission in an RB pair, or a sequence number of an E-CCE used for transmission of an E-PDCCH sent in a precoding manner in an RB pair, which only serve as examples herein and shall not be construed as any limitation.

Exemplarily, the user equipment may also determine the reference signal antenna port according to the aggregation level L and/or the sequence number m of the E-PDCCH in the search space corresponding to the aggregation level L and/or the location of a physical channel resource corresponding to the candidate control channel set. For example, the location of the physical channel resource corresponding to the candidate control channel set is denoted by a location of a first RB of the physical channel resource corresponding to the candidate control channel set, and the location of the first RB of the physical channel resource corresponding to the candidate control channel set is denoted by n_RB, and the reference signal antenna port is determined according to the n_RB.

For example, the user equipment determines the reference signal antenna port according to the aggregation level L, which, for example, may be expressed by the following formula:

$$Port_{DMRS}=[\log(L)\bmod 4]+7$$

where L∈{1,2,4,8}, log refers to taking a logarithm to a base 2, and 7 is a start sequence number of the antenna port.

Alternatively, the user equipment determines the reference signal antenna port according to the sequence number m of the E-PDCCH in the search space corresponding to the aggregation level L, which may be expressed by the following formula:

$$Port_{DMRS}=[m \bmod 4]+7$$

where m≥0.

Alternatively, the user equipment determines the reference signal antenna port according to the location of the physical channel resource corresponding to the candidate control channel set, which may be expressed by the following formula:

$$Port_{DMRS}=[n\_RB \bmod 4]+7$$

where, n_RB≥0.

Still alternatively, the user equipment determines the reference signal antenna port according to the aggregation level L and the sequence number m of the E-PDCCH in the search space corresponding to the aggregation level L, and the UE receives, by using a corresponding reference signal port, all E-CCEs on the $m^{th}$ E-PDCCH in the search space corresponding to the aggregation level L, which, for example, may be expressed by the following formula:

$$Port_{DMRS}=[(\log(L)+m)\bmod 4]+7$$

where, m≥0, L∈{1,2,4,8}, log refers to taking the logarithm to the base 2, and 7 is the start sequence number of the antenna port.

Yet alternatively, the user equipment determines the reference signal antenna port according to the aggregation level L, the sequence number m of the E-PDCCH in the search space corresponding to the aggregation level L, and a location of an $n^{th}$ RB, and the UE receives, by using a corresponding reference signal port, all E-CCEs on the $m^{th}$ E-PDCCH in the search space corresponding to the aggregation level L, which, for example, may be expressed by the following formula:

$$Port_{DMRS}=[(\log(L)+m+n\_RB)\bmod 4]+7$$

where, m≥0, n_RB≥0, L∈{1,2,4,8}, log refers to taking the logarithm to the base 2, and 7 is the start sequence number of the antenna port.

It is worth pointing out that the mapping relationship between the sequence number m of the E-PDCCH in the search space corresponding to the aggregation level L and the reference signal antenna port needs to predefined, so as to ensure that the mapping relationship between the sequence number m of the E-PDCCH in the search space corresponding to the aggregation level L and the reference signal antenna port, which is learnt by the user equipment, is consistent with that of the base station.

Further, the user equipment may also determine the reference signal antenna port according to the methods enumerated in both of the foregoing two examples. For example, the user equipment determines the reference signal antenna port according to the location of the first E-CCE in the $m^{th}$ E-PDCCH in the search space corresponding to the aggregation level L in the candidate control channel set, the aggregation level L, and the sequence number m of the E-PDCCH in the search space corresponding to the aggregation level L, which may be expressed by the following formula:

$$Port_{DMRS}=\{Index_{firstE-CCE}(L,m=0)+\log(L)+m\}\bmod 4\}+7$$

where, the value of m in the location of the first E-CCE in the $m^{th}$ E-PDCCH in the search space is the same as the value of m in the sequence number m of the E-PDCCH in the search space, and m≥0; L∈{1,2,4,8}, log refers to taking the logarithm to the base 2, 7 is the start sequence number of the antenna port, and $Index_{firstE-CCE}(L, m=0)$ denotes the sequence number of the first E-CCE in the $m^{th}$ E-PDCCH in the search space corresponding to the aggregation level L.

It is worth pointing out that the formula enumerated above is only a combination method of the two examples, so as to describe how the user equipment determines the antenna port according to the methods mentioned in the two examples, which, however, shall not be construed as any limitation. Any method for determining the antenna port by using any combination manner of the foregoing shall fall within the protection scope of the present invention. The mapping relationship between the location of the E-CCE and the antenna port, which is enumerated in the method, may also be any other predefined mapping manner that is mutually known to the base station, which shall not be construed as any limitation.

S103. The user equipment receives, by using the antenna port, a control channel or a control channel element sent by the base station.

Exemplarily, the user equipment may receive the control channel element by using the determined antenna port according to a condition in which the control channel element uses the antenna port. For example, when all the control channel elements use a same antenna port, all the control channel elements such as E-CCEs in the candidate control channel set may be received by using the port calculated above; when the control channel elements at one aggregation level use the same antenna port, the antenna port may be calculated for different aggregation levels, and, on the port corresponding to each aggregation level, all the E-CCEs at this aggregation level may be received; in addition, when all the control channel elements in the $m^{th}$ control channel at each aggregation level such as the $m^{th}$ E-PDCCH use the same antenna port, the antenna port may be calculated for the $m^{th}$ E-PDCCH at each aggregation level, and then the E-CCEs on the E-PDCCH are received by using the antenna port corresponding to the $m^{th}$ E-PDCCH at each aggregation level; and when all the control channel elements in the $m^{th}$ E-PDCCH at an $L^{th}$ aggregation level use the same antenna port, the antenna port may also be calculated for the $m^{th}$ E-PDCCH at the $L^{th}$ aggregation level, and then the $m^{th}$E-PDCCH at the $L^{th}$ aggregation level is received by using the port corresponding to the $m^{th}$E-PDCCH at the $L^{th}$ aggregation level, where m is smaller than or equal to a total quantity of control channels at this aggregation level.

It should be noted that in this embodiment of the present invention, the receiving, by the user equipment, a control channel or a control channel element sent by the base station may include: performing, by the user equipment, blind detection in the search space of the determined control channel, and receiving the control channel after detecting the control channel of the user equipment. It should also be understood that after receiving the control channel, the user equipment may, according to control signaling carried on the control channel, receive or send data by using a data channel indicated in the control signaling.

In a control channel resource transmission method provided in this embodiment of the present invention, a user equipment obtains a configuration parameter in a candidate control channel set according to a preset protocol or higher-layer signaling sent by the base station, determines an antenna port according to the configuration parameter, and receives, by using the antenna port, a control channel or a control channel element sent by the base station, and the base station uses the same method to determine the antenna port, and sends the control channel or the control channel element to the user equipment by using the antenna port. In this way, different from the prior art, in which the base station needs to use a PDCCH to notify the user equipment to obtain the antenna port, this embodiment of the present invention enables each user equipment to determine, by using a corresponding parameter, the antenna port, and to send and receive the control channel or the control channel element by using the determined antenna port. This ensures that the user equipment can correctly demodulate and receive the control channel or the control channel element sent by the base station.

Figure 2:
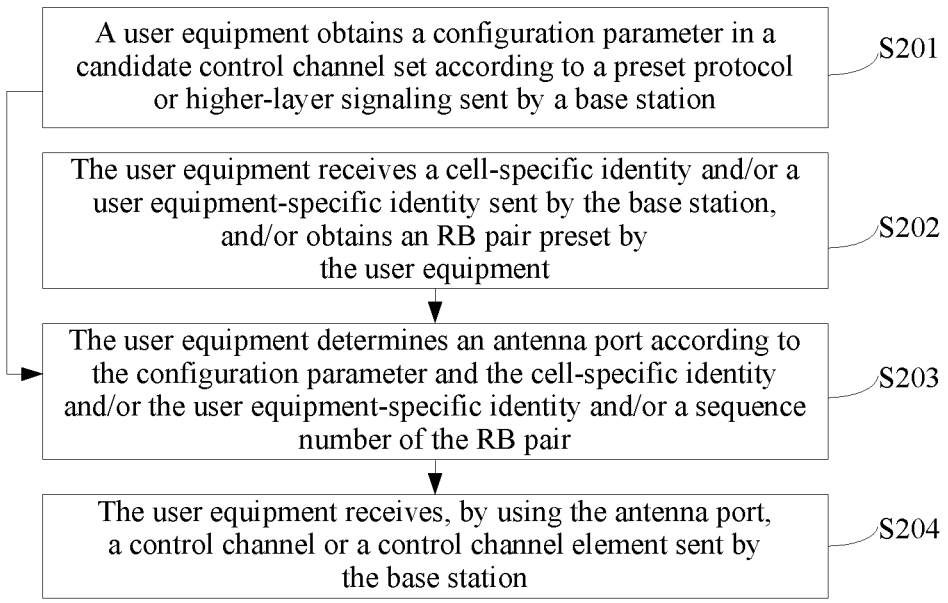
FIG. 2 is a schematic flowchart of another control channel resource transmission method according to an embodiment of the present invention.

Another embodiment of the present invention provides a control channel resource transmission method. In this embodiment, that a control channel is an E-PDCCH and a control channel element is an E-CCE is used as an example, which, however, shall not be construed as any limitation. As shown in FIG. 2, the method includes the following steps:

S201. A user equipment obtains a configuration parameter in a candidate control channel set according to a preset protocol or higher-layer signaling sent by a base station.

Exemplarily, the user equipment may obtain an aggregation level in the candidate control channel set and an $N^{th}$ E-CCE on an E-PDCCH in search space corresponding to the aggregation level; alternatively, the user equipment may obtain an aggregation level L, a sequence number m of an E-PDCCH in the search space corresponding to the aggregation level L, or a location of a physical channel resource corresponding to the candidate control channel set, for example, a sequence number of a first RB pair is denoted by N-RB; still alternatively, the user equipment both obtains a location of the $N^{th}$ E-CCE in search space corresponding to a preselected aggregation level or on the E-PDCCH and obtains any several of the foregoing parameters as configuration parameters, where N is smaller than or equal to a total quantity of E-CCEs on the E-PDCCH in the search space corresponding to the aggregation level. A sequence number of an $m^{th}$ E-PDCCH is generally m, and m≥0 and is smaller than or equal to a total quantity of E-PDCCHs in the search space corresponding to the aggregation level L.

S202. The user equipment receives a cell-specific identity and/or a user equipment-specific identity sent by the base station, and/or obtains an RB pair preset by the user equipment.

Exemplarily, the cell-specific identity may be a cell-specific identity of a cell to which a user belongs, such as a cell identity (ID); and the user equipment-specific identity may be a specific identity Y notified to the user equipment by means of signaling, or another user equipment-specific identity such as an radio network temporary identity (RNTI), or a reference identity used by the user equipment to generate a DMRS sequence, or a scrambling code ID used by the user equipment to generate the DMRS sequence, where the DMRS sequence is generated according to $c_{init} = (\lfloor n_s/2 \rfloor + 1) \cdot (2X+1) \ 2^{16} + n_{SCID}$ where $c_{init}$ is a sequence initialization seed, $n_s$ is a timeslot sequence number, X is a reference identity, and $n_{SCID}$ is a scrambling code ID. All the foregoing identities are specific identities obtained for the user equipment.

Further, a preset sequence number of the RB pair is known by the user equipment, and only needs to be retrieved from the user equipment.

It is worth pointing out that there is no order relationship between step S201 and step S202, and S201 may be performed before or after S202, or the two steps may be performed concurrently.

S203. The user equipment determines an antenna port according to the configuration parameter and the cell-specific identity and/or the user equipment-specific identity and/or the sequence number of the RB pair.

Preferably, the user equipment determines the antenna port according to the configuration parameter and the cell-specific identity and/or the user equipment-specific identity and/or the sequence number of the resource block pair, which may be expressed by the user equipment by using the following formula:

$$Port_{DMRS} = \{Index_{firstE-CCE}(L,m=0) + \log(L) + m + Y\} \bmod 4\} + 7$$

or, $$Port_{DMRS} = \{Index_{firstE-CCE}(L,m=0) + \log(L) + m + RNTI\} \bmod 4\} + 7$$

or $$Port_{DMRS} = \{Index_{firstE-CCE}(L,m=0) + \log(L) + m + cell\_id\} \bmod 4\} + 7$$

or $$Port_{DMRS} = \{Index_{firstE-CCE}(L,m=0) + \log(L) + m + RB\_id\} \bmod 4\} + 7$$

or $$Port_{DMRS} = \{Index_{firstE-CCE}(L,m=0) + \log(L) + m + Y + cell\_id\} \bmod 4\} + 7$$

or $$Port_{DMRS} = \{Index_{firstE-CCE}(L,m=0) + \log(L) + m + cell\_id + RB\_id\} \bmod 4\} + 7$$

or $$Port_{DMRS} = \{Index_{firstE-CCE}(L,m=0) + \log(L) + m + Y + RB\_id\} \bmod 4\} + 7$$

or $$Port_{DMRS} = \{Index_{firstE-CCE}(L,m=0) + \log(L) + m + Y + cell\_id + RB\_id\} \bmod 4\} + 7$$

Exemplarily, in the foregoing formula, Y denotes the user equipment-specific identity, which may be a user equipment-specific identity notified to the user equipment by means of signaling, such as an RNTI, or a reference identity used by the user equipment to generate a DMRS sequence, or a scrambling code ID used by the user equipment to generate the DMRS sequence; cell_id is the cell-specific identity; and RB_id is the sequence number of the resource block pair.

It should be noted that the user equipment may determine a reference signal antenna port by using only some parameters enumerated in the formula, and the methods enumerated above are examples only and shall not be construed as any limitation.

Exemplarily, for each user equipment, the base station configures one or more resource sets (set) for the user equipment. The resource sets are categorized into localized (localized) resource sets and distributed (distributed) resource sets. For the E-PDCCHs corresponding to one aggregation level of one user equipment, the E-PDCCHs have a same start location in a physical resource block PRB pair in different configurations of the localized resource set, but use different reference signal antenna ports, which can reduce a conflict between reference signal antenna ports of different users in a PRB pair or in a same resource. Specifically, the reference signal antenna port, in one of the localized resource sets, corresponding to a user equipment may be a function of $Index_{set}$. In addition, parameters of the function may include at least one of $Index_{ECCE}$, X, L, and cell_id. An example is given below:

$$Port_{DMRS} = f(Index_{set}), \text{ or,}$$

$$Port_{DMRS} = \begin{cases} f_1(X), & \text{if } Index_{set} = p \\ \ldots, & \text{or,} \\ f_m(X), & \text{if } Index_{set} = q \end{cases}$$

$$Port_{DMRS} = (Index_{ECCE} + (X + Index_{set}) \bmod N) \bmod S + 107, \text{ or}$$

$$Port_{DMRS} = (Index_{ECCE} + (X + Index_{set} + \log 2(L)) \bmod N) \bmod S + 107, \text{ or}$$

$$Port_{DMRS} = (Index_{ECCE} + (X + \log 2(L)) \bmod N) \bmod S + 107, \text{ or}$$

$$Port_{DMRS} = (2 \times Index_{ECCE} + (X + \log 2(L)) \bmod (2 \times N)) \bmod S + 107, \text{ or}$$

$$Port_{DMRS} = (2 \times Index_{ECCE} + (X + Index_{set}) \bmod (2 \times N)) \bmod S + 107, \text{ or}$$

$$Port_{DMRS} = (2 \times Index_{ECCE} + (X + Index_{set} + \log 2(L)) \bmod (2 \times N)) \bmod S + 107$$

Exemplarily, for localized E-PDCCHs that correspond to one aggregation level of one user equipment and have the same start location in the PRB pair, different X values correspond to different reference signal antenna ports. An example is given below:

$Port_{DMRS}=f(X)$, or $Port_{DMRS}=f(X_1,X_2, \ldots ,X_H)$, or $Port_{DMRS}=(Index_{ECCE}+(X_1+X_2) \bmod N) \bmod S+107$, or $Port_{DMRS}=(2 \times Index_{ECCE}+(X_1+X_2) \bmod (2 \times N)) \bmod S+107$, or $Port_{DMRS}=(Index_{ECCE}+(X_1+X_2+\log 2(L)) \bmod N) \bmod S+107$, or $Port_{DMRS}=(2 \times Index_{ECCE}+(X_1+X_2+\log 2(L)) \bmod (2 \times N)) \bmod S+107$, or $Port_{DMRS}=(Index_{ECCE}+(X_1+X_2+Index_{set}) \bmod N) \bmod S+107$, or $Port_{DMRS}=(2 \times Index_{ECCE}+(X_1+X_2+Index_{set}) \bmod (2 \times N)) \bmod S+107$, or $Port_{DMRS}=(Index_{ECCE}+(X_1+X_2+Index_{set}+\log 2(L)) \bmod N) \bmod S+107$, or $Port_{DMRS}=(2 \times Index_{ECCE}+(X_1+X_2+Index_{set}+\log 2(L)) \bmod (2 \times N)) \bmod S+107$, or $Port_{DMRS}=(Index_{ECCE}+(Y_k+\log 2(L)) \bmod N) \bmod S+107$, or $Port_{DMRS}=(2 \times Index_{ECCE}+(Y_k+Index_{set}+\log 2(L)) \bmod (2 \times N)) \bmod S+107$, or $Port_{DMRS}=(Index_{ECCE}+(Y_k+\text{ceil}(L/T)) \bmod N) \bmod S+107$, or $Port_{DMRS}=(2 \times Index_{ECCE}+(Y_k+Index_{set}+\text{ceil}(L/T)) \bmod (2 \times N)) \bmod S+107$ Exemplarily, when a quantity of available reference signal antenna ports in a PRB pair is R, in an E-PDCCH localized resource set, an E-PDCCH of a user equipment whose aggregation level is higher than or equal to Z corresponds to a reference signal antenna port, and the E-PDCCHs of different users may correspond to different reference signal antenna ports, where a quantity of the different reference signal antenna ports is smaller than R.

Further, in an E-PDCCH localized resource set, a reference signal antenna port corresponding to an E-PDCCH of a user equipment whose aggregation level is higher than or equal to T belongs to a reference signal antenna port set 1 or a reference signal antenna port set 2, where a quantity of reference signal antenna ports included in the reference signal antenna port set 1 or 2 is smaller than R.

Further, for a user equipment, a value of W and/or V decides the reference signal antenna port corresponding to the E-PDCCH at the aggregation level. Further, the value of W decides whether the reference signal antenna port corresponding to the E-PDCCH at the aggregation level belongs to the reference signal antenna port set 1 or 2. Further, for a user equipment, the value of V decides that a reference signal antenna port selected from the reference signal antenna port set is the reference signal antenna port corresponding to the E-PDCCH at the aggregation level, where W and V denote identities configured by the base station for the user equipment, and may be $Index_{set}$ or X.

Specifically, if a quantity of E-CCEs included in a PRB pair is 4, a value of Z is 4, and a value of R is 4. For a user equipment, the reference signal antenna port corresponding to the E-PDCCH at an aggregation level higher than 4 belongs to the reference signal antenna port set 1 or 2, where the aggregation level corresponds to the user equipment. The corresponding reference signal antenna port is determined according to W and/or V.

Optionally, the reference signal antenna port set 1 includes {reference signal antenna port 107, reference signal antenna port 109}, and the reference signal antenna port set 2 includes {reference signal antenna port 108, reference signal antenna port 110}; or, the reference signal antenna port set 1 includes {reference signal antenna port 107, reference signal antenna port 110}, and the reference signal antenna port set 2 includes {reference signal antenna port 108, reference signal antenna port 109}; or, the reference signal antenna port set 1 includes {reference signal antenna port 107, reference signal antenna port 108}, and the reference signal antenna port set 2 includes {reference signal antenna port 109, reference signal antenna port 110}.

For a normal cyclic prefix subframe, S=4; for an extended cyclic prefix subframe, S=2; N is a quantity of ECCEs, of the E-PDCCH, in a PRB pair, $Index_{ECCE}$ is a sequence number or sequence number information of a start E-CCE of the E-PDCCH in a PRB pair; $Index_{set}$ is a sequence number or sequence number information of the resource set or a specific parameter of the resource set; cell_id is a cell-specific identity or a virtual cell-specific identity; L is an aggregation level; and T is a quantity of ECCEs included in a PRB pair.

X denotes a user equipment-specific parameter, and may be a user equipment-specific identity such as an RNTI (radio network temporary identity), or a reference identity used by the user equipment to generate a DMRS sequence, or a scrambling code ID used by the user equipment to generate the DMRS sequence, or an initialization parameter $Y_k$ for generating a location of a CCE corresponding to the search space of the control channel, where $Y_k=(A \cdot Y_{k-1}) \bmod$, whose meanings are detailed in Section 9.1.1 PDCCH Assignment Procedure of 3GPP 36.213 V10.6.0 (Physical Channels and Modulation, Release 10), where a specific form of expression of $Y_k$ may be updated according to updates of definitions in a new version of 3GPP 36.213. $X_1$, $X_2$, and $X_H$ are specific examples of the X identities listed above, and H is greater than or equal to 2.

Exemplarily, Tables 1 to 4 list specific methods for selecting a reference signal antenna port. Depending on different aggregation levels supported, the selection of the reference signal antenna port may be in certain rows in the tables. As shown in Table 1, for a first aggregation level 1 of a first user equipment, when $\text{Index}_{ECCE}=e$, the reference signal antenna port selected for the E-PDCCH is 107; when $\text{Index}_{ECCE}=f$, the reference signal antenna port selected for the E-PDCCH is 108; when $\text{Index}_{ECCE}=g$, the reference signal antenna port selected for the E-PDCCH is 109; and, when $\text{Index}_{ECCE}=k$, the reference signal antenna port selected for the E-PDCCH is 110, and so on, where e, f, g, and k are specific values of $\text{Index}_{ECCE}$ for example, any one value of 0, 1, 2, 3, and 4.

TABLE 1

| Aggregation level | First user equipment | Second user equipment | Third user equipment | Fourth user equipment |
|---|---|---|---|---|
| 1 | $\text{Index}_{ECCE}$ = e, 107 | $\text{Index}_{ECCE}$ = e, 107 | $\text{Index}_{ECCE}$ = e, 107 | $\text{Index}_{ECCE}$ = e, 107 |
|   | $\text{Index}_{ECCE}$ = f, 108 | $\text{Index}_{ECCE}$ = f, 108 | $\text{Index}_{ECCE}$ = f, 108 | $\text{Index}_{ECCE}$ = f, 108 |
|   | $\text{Index}_{ECCE}$ = g, 109 | $\text{Index}_{ECCE}$ = g, 109 | $\text{Index}_{ECCE}$ = g, 109 | $\text{Index}_{ECCE}$ = g, 109 |
|   | $\text{Index}_{ECCE}$ = k, 110 | $\text{Index}_{ECCE}$ = k, 1100 | $\text{Index}_{ECCE}$ = k, 110 | $\text{Index}_{ECCE}$ = k, 110 |
| 2 | $\text{Index}_{ECCE}$ = e, 108 | $\text{Index}_{ECCE}$ = e, 107 | $\text{Index}_{ECCE}$ = e, 108 | $\text{Index}_{ECCE}$ = e, 107 |
|   | $\text{Index}_{ECCE}$ = g, 110 | $\text{Index}_{ECCE}$ = g, 109 | $\text{Index}_{ECCE}$ = g, 110 | $\text{Index}_{ECCE}$ = g, 109 |
| 4 | $\text{Index}_{ECCE}$ = e, 109 | $\text{Index}_{ECCE}$ = e, 110 | $\text{Index}_{ECCE}$ = e, 107 | $\text{Index}_{ECCE}$ = e, 108 |
| 8 | $\text{Index}_{ECCE}$ = e, 110 | $\text{Index}_{ECCE}$ = e, 107 | $\text{Index}_{ECCE}$ = e, 108 | $\text{Index}_{ECCE}$ = e, 109 |
| 16 | $\text{Index}_{ECCE}$ = e, 107 | $\text{Index}_{ECCE}$ = e, 108 | $\text{Index}_{ECCE}$ = e, 109 | $\text{Index}_{ECCE}$ = e, 110 |

TABLE 2

| Aggregation level | First user equipment | Second user equipment | Third user equipment | Fourth user equipment |
|---|---|---|---|---|
| 1 | $\text{Index}_{ECCE}$ = e, 107 | $\text{Index}_{ECCE}$ = e, 108 | $\text{Index}_{ECCE}$ = e, 107 | $\text{Index}_{ECCE}$ = e, 108 |
|   | $\text{Index}_{ECCE}$ = f, 109 | $\text{Index}_{ECCE}$ = f, 110 | $\text{Index}_{ECCE}$ = f, 109 | $\text{Index}_{ECCE}$ = f, 110 |
| 2 | $\text{Index}_{ECCE}$ = e, 108 | $\text{Index}_{ECCE}$ = e, 109 | $\text{Index}_{ECCE}$ = e, 110 | $\text{Index}_{ECCE}$ = e, 107 |
| 4 | $\text{Index}_{ECCE}$ = e, 109 | $\text{Index}_{ECCE}$ = e, 110 | $\text{Index}_{ECCE}$ = e, 107 | $\text{Index}_{ECCE}$ = e, 108 |
| 8 | $\text{Index}_{ECCE}$ = e, 110 | $\text{Index}_{ECCE}$ = e, 107 | $\text{Index}_{ECCE}$ = e, 108 | $\text{Index}_{ECCE}$ = e, 109 |
| 16 | $\text{Index}_{ECCE}$ = e, 107 | $\text{Index}_{ECCE}$ = e, 108 | $\text{Index}_{ECCE}$ = e, 109 | $\text{Index}_{ECCE}$ = e, 110 |

TABLE 3

| Aggregation level | First localized resource set (or first X value) | | First localized resource set (or second X value) | |
|---|---|---|---|---|
|   | First user equipment | Second user equipment | First user equipment | Second user equipment |
| 1 | $\text{Index}_{ECCE}$ = e, 107 | $\text{Index}_{ECCE}$ = e, 107 | $\text{Index}_{ECCE}$ = e, 107 | $\text{Index}_{ECCE}$ = e, 107 |
|   | $\text{Index}_{ECCE}$ = f, 108 | $\text{Index}_{ECCE}$ = f, 108 | $\text{Index}_{ECCE}$ = f, 108 | $\text{Index}_{ECCE}$ = f, 108 |
|   | $\text{Index}_{ECCE}$ = g, 109 | $\text{Index}_{ECCE}$ = g, 109 | $\text{Index}_{ECCE}$ = g, 109 | $\text{Index}_{ECCE}$ = g, 109 |
|   | $\text{Index}_{ECCE}$ = k, 110 | $\text{Index}_{ECCE}$ = k, 1100 | $\text{Index}_{ECCE}$ = k, 110 | $\text{Index}_{ECCE}$ = k, 110 |
| 2 | $\text{Index}_{ECCE}$ = e, 107 | $\text{Index}_{ECCE}$ = e, 108 | $\text{Index}_{ECCE}$ = e, 107 | $\text{Index}_{ECCE}$ = e, 108 |
|   | $\text{Index}_{ECCE}$ = g, 109 | $\text{Index}_{ECCE}$ = g, 110 | $\text{Index}_{ECCE}$ = g, 109 | $\text{Index}_{ECCE}$ = g, 110 |
| 4 | $\text{Index}_{ECCE}$ = e, 107 | $\text{Index}_{ECCE}$ = e, 109 | $\text{Index}_{ECCE}$ = e, 108 | $\text{Index}_{ECCE}$ = e, 110 |
| 8 | $\text{Index}_{ECCE}$ = e, 109 | $\text{Index}_{ECCE}$ = e, 107 | $\text{Index}_{ECCE}$ = e, 110 | $\text{Index}_{ECCE}$ = e, 108 |
| 16 | $\text{Index}_{ECCE}$ = e, 107 | $\text{Index}_{ECCE}$ = e, 109 | $\text{Index}_{ECCE}$ = e, 108 | $\text{Index}_{ECCE}$ = e, 110 |

TABLE 4

| Aggregation level | First localized resource set (or first X value) | | First localized resource set (or second X value) | |
|---|---|---|---|---|
|   | First user equipment | Second user equipment | First user equipment | Second user equipment |
| 1 | $\text{Index}_{ECCE}$ = e, 107 | $\text{Index}_{ECCE}$ = e, 107 | $\text{Index}_{ECCE}$ = e, 107 | $\text{Index}_{ECCE}$ = e, 107 |
|   | $\text{Index}_{ECCE}$ = f, 108 | $\text{Index}_{ECCE}$ = f, 108 | $\text{Index}_{ECCE}$ = f, 108 | $\text{Index}_{ECCE}$ = f, 108 |
|   | $\text{Index}_{ECCE}$ = g, 109 | $\text{Index}_{ECCE}$ = g, 109 | $\text{Index}_{ECCE}$ = g, 109 | $\text{Index}_{ECCE}$ = g, 109 |
|   | $\text{Index}_{ECCE}$ = k, 110 | $\text{Index}_{ECCE}$ = k, 1100 | $\text{Index}_{ECCE}$ = k, 110 | $\text{Index}_{ECCE}$ = k, 110 |
| 2 | $\text{Index}_{ECCE}$ = e, 107 | $\text{Index}_{ECCE}$ = e, 108 | $\text{Index}_{ECCE}$ = e, 108 | $\text{Index}_{ECCE}$ = e, 107 |
|   | $\text{Index}_{ECCE}$ = g, 109 | $\text{Index}_{ECCE}$ = g, 110 | $\text{Index}_{ECCE}$ = g, 110 | $\text{Index}_{ECCE}$ = g, 109 |
| 4 | $\text{Index}_{ECCE}$ = e, 107 | $\text{Index}_{ECCE}$ = e, 108 | $\text{Index}_{ECCE}$ = e, 108 | $\text{Index}_{ECCE}$ = e, 107 |
| 8 | $\text{Index}_{ECCE}$ = e, 109 | $\text{Index}_{ECCE}$ = e, 110 | $\text{Index}_{ECCE}$ = e, 110 | $\text{Index}_{ECCE}$ = e, 109 |
| 16 | $\text{Index}_{ECCE}$ = e, 107 | $\text{Index}_{ECCE}$ = e, 108 | $\text{Index}_{ECCE}$ = e, 108 | $\text{Index}_{ECCE}$ = e, 107 |

S204. The user equipment receives, by using the antenna port, a control channel or a control channel element sent by the base station.

Preferably, when the user equipment determines the reference signal antenna port according to the location of the first E-CCE in the search space in the candidate control channel set or in the E-PDCCH, the corresponding E-PDCCH or E-CCE may be received according to a corresponding signal port.

Exemplarily, when the user equipment determines an antenna port according to the location of the first E-CCE in the search space corresponding to the aggregation level L=1 in the candidate control channel set, all E-CCEs in the candidate control channel set may be received by using the antenna port.

When the user equipment determines an antenna port according to the location of the first E-CCE in an $m^{th}$ E-PDCCH in the search space corresponding to the aggregation level L=1 in the candidate control channel set, the $m^{th}$ E-PDCCH at each aggregation level in the candidate control channel set may be separately received by using the antenna port determined according to the $m^{th}$ E-PDCCH.

It should be noted that, a difference between the foregoing demodulation method and this method is: E-PDCCHs in the search space corresponding to the aggregation level L may correspond to different antenna ports.

When the user equipment determines an antenna port according to the location of the first E-CCE in the search space corresponding to the aggregation level L in the candidate control channel set, all E-CCEs at the aggregation level L in the candidate control channel set may be separately received by using the antenna port corresponding to the aggregation level L.

When the user equipment determines an antenna port according to the location of the first E-CCE in the $m^{th}$ E-PDCCH in the search space corresponding to the aggregation level L in the candidate control channel set, all E-CCEs on the $m^{th}$ E-PDCCH at the aggregation level L in the candidate control channel set may be received by using the antenna port corresponding to the $m^{th}$ E-PDCCH at the aggregation level L.

Preferably, when the user equipment determines an antenna port according to the aggregation level L and/or the sequence number m of the E-PDCCH in the search space corresponding to the aggregation level L, the corresponding E-PDCCH or E-CCE may be received according to the antenna port.

Exemplarily, when the user equipment determines an antenna port according to the aggregation level L, all E-CCEs at the aggregation level L may be received by using the antenna port corresponding to the aggregation level L.

When the user equipment determines an antenna port according to the sequence number m of the E-PDCCH in the search space corresponding to the aggregation level L, all E-CCEs on the $m^{th}$ E-PDCCH in the search space corresponding to the aggregation level L may be received by using the corresponding antenna port.

When the user equipment determines an antenna port according to the aggregation level L and the sequence number m of the E-PDCCH in the search space corresponding to the aggregation level L, all E-CCEs on the $m^{th}$ E-PDCCH in the search space corresponding to the aggregation level L may be received by using the corresponding antenna port.

Preferably, when the user equipment not only determines the antenna port according to the foregoing two preferred solutions, but also determines the antenna port according to a user equipment-specific identity and/or a sequence number of a resource block pair, the corresponding antenna port may be selected according to different configuration parameters in the foregoing solutions to receive the E-CCEs on the same E-PDCCH or different E-PDCCHs at the same aggregation level or different aggregation levels. The detailed corresponding manner has been described above, and is not repeated herein any further.

In a control channel resource transmission method provided in this embodiment of the present invention, a user equipment obtains a configuration parameter in a candidate control channel set according to a preset protocol or higher-layer signaling sent by the base station, determines an antenna port according to the configuration parameter, and receives, by using the antenna port, a control channel or a control channel element sent by the base station, and the base station uses the same method to determine the antenna port, and sends the control channel or the control channel element to the user equipment by using the antenna port. In this way, different from the prior art, in which the base station needs to use a PDCCH to notify the user equipment to obtain the antenna port, this embodiment of the present invention enables each user equipment to determine, by using a corresponding parameter, the antenna port, and to send and receive the control channel or the control channel element by using the determined antenna port. This ensures that the user equipment can correctly demodulate and receive the control channel or the control channel element sent by the base station.

Figure 3:
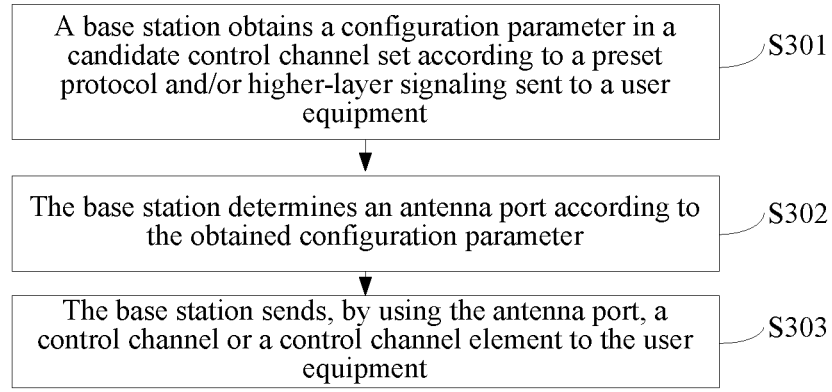
FIG. 3 is a schematic flowchart of still another control channel resource transmission method according to an embodiment of the present invention.

Still another embodiment of the present invention provides a control channel resource transmission method. As shown in FIG. 3, this method includes the following steps:

S301. A base station obtains a configuration parameter in a candidate control channel set according to a preset protocol and/or higher-layer signaling sent to a user equipment.

The higher-layer signaling is used to notify the configuration parameter.

It should be noted that the preset protocol is known to both the base station and the user equipment, and the base station can obtain the configuration parameter in the same way as that of the user equipment. The configuration parameter is the same as that obtained by the user equipment, and has been described in the foregoing embodiment and is not repeated herein any further.

S302. The base station determines an antenna port according to the obtained configuration parameter.

It should be noted that after the base station obtains the configuration parameter and uses a corresponding manner to determine an antenna port, the user equipment uses the same policy, the same configuration parameter, and the same method to determine the antenna port. Therefore, the method for determining the configuration parameter by the base station is the same as the method for determining the antenna port by the user equipment. The method for determining the antenna port by the user equipment may be applied to perform the determining. That is, the related description in the previous embodiment is applicable to this embodiment, and is not repeated herein any further.

S303. The base station sends, by using the antenna port, a control channel or a control channel element to the user equipment.

Exemplarily, the base station may send, by using the antenna port, an E-PDCCH or an E-CCE to the user equipment.

Further, according to a condition in which the E-CCE uses the antenna port, the base station determines a port for sending the E-CCE. For example, if all E-CCEs in the candidate control channel set use a same antenna port, all the E-CCEs in the candidate control channel set are sent by using the determined antenna port.

In a control channel resource transmission method provided in this embodiment of the present invention, a user equipment obtains a configuration parameter in a candidate control channel set according to a preset protocol or higher-layer signaling sent by the base station, determines an antenna port according to the configuration parameter, and receives, by using the antenna port, a control channel or a control channel element sent by the base station. The base station uses the same method to determine the antenna port, and sends the control channel or the control channel element to the user equipment by using the antenna port. In this way, different from the prior art, in which the base station needs to use a PDCCH to notify the user equipment to obtain the antenna port, this embodiment of the present invention enables each user equipment to determine, by using a corresponding parameter, the antenna port, and to send and receive the control channel or the control channel element by using the determined antenna port. This ensures that the user equipment can correctly demodulate and receive the control channel or the control channel element sent by the base station.

Figure 4:
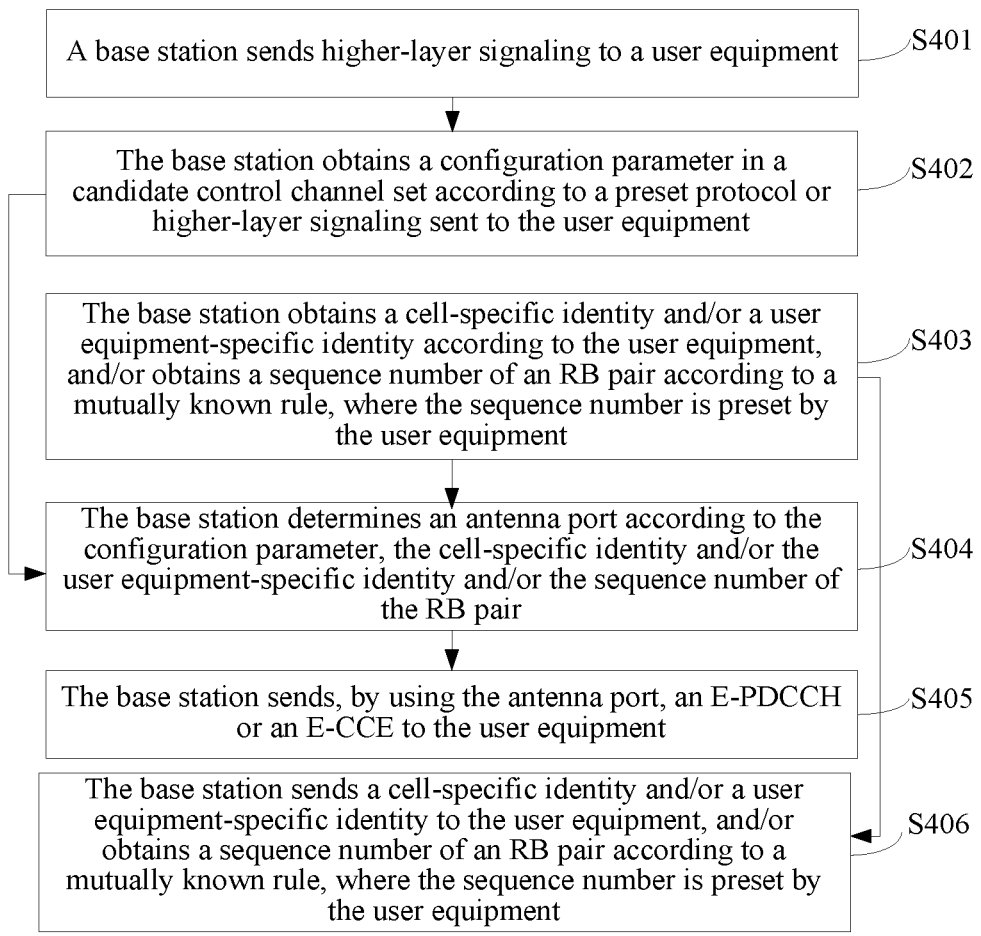
FIG. 4 is a schematic flowchart of yet another control channel resource transmission method according to an embodiment of the present invention.

Yet another embodiment of the present invention provides a control channel resource transmission method. The following is used as an example: a control channel is an E-PDCCH and a control channel element is an E-CCE. As shown in FIG. 4, the method includes the following steps:

S401. A base station sends higher-layer signaling to a user equipment.

The higher-layer signaling is used to notify a configuration parameter.

S402. The base station obtains a configuration parameter in a candidate control channel set according to a preset protocol or the higher-layer signaling sent to the user equipment.

Exemplarily, the configuration parameter obtained by the base station may be an $N^{th}$ E-CCE in search space corresponding to a preset aggregation level in the candidate control channel set. For example, an aggregation level L=1 corresponds to a location of a first E-CCE or a third E-CCE in the search space.

The configuration parameter obtained by the base station may also be a location of an $N^{th}$ control channel element in search space corresponding to an aggregation level in the candidate control channel set, where N is smaller than or equal to a total quantity of control channel elements in the search space, or may be a location of an $N^{th}$ control channel element on a control channel in search space corresponding to an aggregation level in the candidate control channel set, where N is smaller than or equal to a total quantity of control channel elements on the control channel.

In addition, the configuration parameter obtained by the base station may be a preselected aggregation level in the candidate control channel set or a sequence number of a preselected E-PDCCH in search space corresponding to the preselected aggregation level, such as m; or a location of a physical channel resource corresponding to the candidate control channel set, such as n_RB.

Further, the configuration parameter obtained by the base station may also be one or more of the foregoing configuration parameters. For example, the configuration parameters are the search space in the candidate control channel set or the first E-CCE on the E-PDCCH in the search space, the preselected aggregation level L in the candidate control channel set, the sequence number m of the E-PDCCH in the search space corresponding to the preselected aggregation level L, and the first RB in the candidate control channel set, and the like.

S403. The base station obtains a cell-specific identity and/or a user equipment-specific identity according to the user equipment, and/or obtains a sequence number of an RB pair according to a mutually known rule, where the sequence number is preset by the user equipment.

Exemplarily, the base station may obtain a specific identity Y of the user equipment, such as a radio network temporary identity (RNTI), and a cell-specific identity of a cell that serves the user, such as a cell identity (ID). It should be noted that the specific identity Y that is specific to the user equipment and obtained by the base station and sent to the user equipment is the same as the user equipment-specific identity Y received by the user equipment, and is not repeated herein any further.

Further, the preset sequence number of the RB pair is known by the base station, and only needs to be retrieved from the base station.

It should be noted that there is no order relationship between step S402 and step S403, and the two steps may be performed in a reverse order or concurrently.

S404. The base station determines an antenna port according to the configuration parameter, the cell-specific identity and/or the user equipment-specific identity and/or the sequence number of the RB pair.

Exemplarily, for each user equipment, the base station configures one or more resource sets for the user equipment. The resource sets are categorized into localized resource sets and distributed resource sets. For the E-PDCCHs corresponding to one aggregation level of one user equipment, the E-PDCCHs have a same start location in a PRB pair in different configurations of the localized resource set, but use different reference signal antenna ports, which can reduce a conflict between reference signal antenna ports of different users in a PRB pair or in a same resource. Specifically, the reference signal antenna port, in one of the localized resource sets, corresponding to a user equipment may be a function of $Index_{set}$. In addition, parameters of the function may include at least one of $Index_{ECCE}$, X, L, and cell_id. An example is given below:

$$Port_{DMRS} = f(Index_{set}), \text{ or,}$$

$$Port_{DMRS} = \begin{cases} f_1(X), & \stackrel{\text{w}}{=} Index_{set} = p \\ \ldots, & \text{or,} \\ f_m(X), & \stackrel{\text{w}}{=} Index_{set} = q, \end{cases}$$

$$Port_{DMRS} = (Index_{ECCE} + (X + Index_{set}) \bmod N) \bmod S + 107, \text{ or}$$

$$Port_{DMRS} = (Index_{ECCE} + (X + Index_{set} + \log 2(L)) \bmod N) \bmod S + 107, \text{ or}$$

$$Port_{DMRS} = (Index_{ECCE} + (X + \log 2(L)) \bmod N) \bmod S + 107, \text{ or}$$

$$Port_{DMRS} = (2 \times Index_{ECCE} + (X + \log 2(L)) \bmod (2 \times N)) \bmod S + 107, \text{ or}$$

$$Port_{DMRS} = (2 \times Index_{ECCE} + (X + Index_{set}) \bmod (2 \times N)) \bmod S + 107, \text{ or}$$

$$Port_{DMRS} =$$
$$(2 \times Index_{ECCE} + (X + Index_{set} + \log 2(L)) \bmod (2 \times N)) \bmod S + 107$$

Exemplarily, for localized E-PDCCHs that correspond to one aggregation level of one user equipment and have the same start location in the PRB pair, different X values correspond to different reference signal antenna ports. An example is given below:

$Port_{DMRS}=f(X)$, or $Port_{DMRS}=f(X_1,X_2,\ldots X_H)$, or $Port_{DMRS}=(Index_{ECCE}+(X_1+X_2)\bmod N)\bmod S+107$, or $Port_{DMRS}=(2\times Index_{ECCE}+(X_1+X_2)\bmod(2\times N))\bmod S+107$, or $Port_{DMRS}=(Index_{ECCE}+(X_1+X_2+\log 2(L))\bmod N)\bmod S+107$, or $Port_{DMRS}=(2\times Index_{ECCE}+(X_1+X_2+\log 2(L))\bmod(2\times N))\bmod S+107$, or $Port_{DMRS}=(Index_{ECCE}+(X_1+X_2+Index_{set})\bmod N)\bmod S+107$, or $Port_{DMRS}=(2\times Index_{ECCE}+(X_1+X_2+Index_{set})\bmod(2\times N))\bmod S+107$, or $Port_{DMRS}=(Index_{ECCE}+(X_1+X_2+Index_{set}+\log 2(L))\bmod N)\bmod S+107$, or $Port_{DMRS}=(2\times Index_{ECCE}+(X_1+X_2+Index_{set}+\log 2(L))\bmod(2\times N))\bmod S+107$, or $Port_{DMRS}=(Index_{ECCE}+(Y_k+\log 2(L))\bmod N)\bmod S+107$, or $Port_{DMRS}=(2\times Index_{ECCE}+(Y_k+Index_{set}+\log 2(L))\bmod(2\times N))\bmod S+107$, or $Port_{DMRS}=(Index_{ECCE}+(Y_k+ceil(L/T))\bmod N)\bmod S+107$, or $Port_{DMRS}=(2\times Index_{ECCE}+(Y_k+Index_{set}+ceil(L/T))\bmod(2\times N))\bmod S+107$ Exemplarily, when a quantity of available reference signal antenna ports in a PRB pair is R, in an E-PDCCH localized resource set, an E-PDCCH of a user equipment whose aggregation level is higher than or equal to Z corresponds to a reference signal antenna port, and the E-PDCCHs of different users may correspond to different reference signal antenna ports, where a quantity of the different reference signal antenna ports is smaller than R.

Further, in an E-PDCCH localized resource set, a reference signal antenna port corresponding to an E-PDCCH of a user equipment whose aggregation level is higher than or equal to T belongs to a reference signal antenna port set 1 or a reference signal antenna port set 2, where a quantity of reference signal antenna ports included in the reference signal antenna port set 1 or 2 is smaller than R.

Further, for a user equipment, a value of W and/or V decides the reference signal antenna port corresponding to the E-PDCCH at the aggregation level. Further, the value of W decides whether the reference signal antenna port corresponding to the E-PDCCH at the aggregation level belongs to the reference signal antenna port set 1 or 2. Further, for a user equipment, the value of V decides that a reference signal antenna port selected from the reference signal antenna port set is the reference signal antenna port corresponding to the E-PDCCH at the aggregation level, where W and V denote identities configured by the base station for the user equipment, and may be $Index_{set}$ or X.

Specifically, if a quantity of E-CCEs included in a PRB pair is 4, a value of Z is 4, and a value of R is 4. For a user equipment, the reference signal antenna port corresponding to the E-PDCCH at an aggregation level higher than 4 belongs to the reference signal antenna port set 1 or 2, where the aggregation level corresponds to the user equipment. The corresponding reference signal antenna port is determined according to W and/or V.

Optionally, the reference signal antenna port set 1 includes {reference signal antenna port 107, reference signal antenna port 109}, and the reference signal antenna port set 1 includes {reference signal antenna port 108, reference signal antenna port 110}; or, the reference signal antenna port set 1 includes {reference signal antenna port 107, reference signal antenna port 110}, and the reference signal antenna port set 1 includes {reference signal antenna port 108, reference signal antenna port 109}; or, the reference signal antenna port set 1 includes {reference signal antenna port 107, reference signal antenna port 108}, and the reference signal antenna port set 1 includes {reference signal antenna port 109, reference signal antenna port 110}.

For a normal cyclic prefix subframe, S=4; for an extended cyclic prefix subframe, S=2; N is a quantity of ECCEs, of the E-PDCCH, in a PRB pair, $Index_{ECCE}$ is a sequence number or sequence number information of a start E-CCE of the E-PDCCH in a PRB pair; $Index_{set}$ is a sequence number or sequence number information of the resource set or a specific parameter of the resource set; cell_id is a cell-specific identity or a virtual cell-specific identity; L is an aggregation level; and T is a quantity of ECCEs included in a PRB pair.

X denotes a user equipment-specific parameter, and may be a user equipment-specific identity such as an RNTI (radio network temporary identity), or a reference identity used by the user equipment to generate a DMRS sequence, or a scrambling code ID used by the user equipment to generate the DMRS sequence, or an initialization parameter $Y_k$ for generating a location of a CCE corresponding to the search space of the control channel, where $Y_k=(A\cdot Y_{k-1})\bmod D$, whose meanings are detailed in Section 9.1.1 PDCCH Assignment Procedure (PDCCH Assignment Procedure) of 3GPP 36.213 V10.6.0 (Physical Channels and Modulation, Release 10), where a specific form of expression of $Y_k$ may be updated according to updates of definitions in a new version of 3GPP 36.213. $X_1$, $X_2$, and $X_H$ are specific examples of the X identities listed above, and H is greater than or equal to 2.

Exemplarily, Tables 1 to 4 list specific methods for selecting a reference signal antenna port. Depending on different aggregation levels supported, the selection of the reference signal antenna port may be in certain rows in the tables. As shown in Table 1, for a first aggregation level 1 of a first user equipment, when $Index_{ECCE}=e$, the reference signal antenna port selected for the E-PDCCH is 107; when $Index_{ECCE}=f$, the reference signal antenna port selected for the E-PDCCH is 108; when $Index_{ECCE}=g$, the reference signal antenna port selected for the E-PDCCH is 109; and, when $Index_{ECCE}=k$, the reference signal antenna port selected for the E-PDCCH is 110, and so on, where e, f, g, and k are specific values of $Index_{ECCE}$, for example, any one value of 0, 1, 2, 3, and 4.

TABLE 1

| Aggregation level | First user equipment | Second user equipment | Third user equipment | Fourth user equipment |
|---|---|---|---|---|
| 1 | $Index_{ECCE}$ = e, 107<br>$Index_{ECCE}$ = f, 108<br>$Index_{ECCE}$ = g, 109<br>$Index_{ECCE}$ = k, 110 | $Index_{ECCE}$ = e, 107<br>$Index_{ECCE}$ = f, 108<br>$Index_{ECCE}$ = g, 109<br>$Index_{ECCE}$ = k, 1100 | $Index_{ECCE}$ = e, 107<br>$Index_{ECCE}$ = f, 108<br>$Index_{ECCE}$ = g, 109<br>$Index_{ECCE}$ = k, 110 | $Index_{ECCE}$ = e, 107<br>$Index_{ECCE}$ = f, 108<br>$Index_{ECCE}$ = g, 109<br>$Index_{ECCE}$ = k, 110 |
| 2 | $Index_{ECCE}$ = e, 108<br>$Index_{ECCE}$ = g, 110 | $Index_{ECCE}$ = e, 107<br>$Index_{ECCE}$ = g, 109 | $Index_{ECCE}$ = e, 108<br>$Index_{ECCE}$ = g, 110 | $Index_{ECCE}$ = e, 107<br>$Index_{ECCE}$ = g, 109 |
| 4 | $Index_{ECCE}$ = e, 109 | $Index_{ECCE}$ = e, 110 | $Index_{ECCE}$ = e, 107 | $Index_{ECCE}$ = e, 108 |
| 8 | $Index_{ECCE}$ = e, 110 | $Index_{ECCE}$ = e, 107 | $Index_{ECCE}$ = e, 108 | $Index_{ECCE}$ = e, 109 |
| 16 | $Index_{ECCE}$ = e, 107 | $Index_{ECCE}$ = e, 108 | $Index_{ECCE}$ = e, 109 | $Index_{ECCE}$ = e, 110 |

TABLE 2

| Aggregation level | First user equipment | Second user equipment | Third user equipment | Fourth user equipment |
|---|---|---|---|---|
| 1 | $Index_{ECCE}$ = e, 107<br>$Index_{ECCE}$ = f, 109 | $Index_{ECCE}$ = e, 108<br>$Index_{ECCE}$ = f, 110 | $Index_{ECCE}$ = e, 107<br>$Index_{ECCE}$ = f, 109 | $Index_{ECCE}$ = e, 108<br>$Index_{ECCE}$ = f, 110 |
| 2 | $Index_{ECCE}$ = e, 108 | $Index_{ECCE}$ = e, 109 | $Index_{ECCE}$ = e, 110 | $Index_{ECCE}$ = e, 107 |
| 4 | $Index_{ECCE}$ = e, 109 | $Index_{ECCE}$ = e, 110 | $Index_{ECCE}$ = e, 107 | $Index_{ECCE}$ = e, 108 |
| 8 | $Index_{ECCE}$ = e, 110 | $Index_{ECCE}$ = e, 107 | $Index_{ECCE}$ = e, 108 | $Index_{ECCE}$ = e, 109 |
| 16 | $Index_{ECCE}$ = e, 107 | $Index_{ECCE}$ = e, 108 | $Index_{ECCE}$ = e, 109 | $Index_{ECCE}$ = e, 110 |

TABLE 3

| Aggregation level | First localized resource set (or first X value) | | First localized resource set (or second X value) | |
|---|---|---|---|---|
| | First user equipment | Second user equipment | First user equipment | Second user equipment |
| 1 | $Index_{ECCE}$ = e, 107<br>$Index_{ECCE}$ = f, 108<br>$Index_{ECCE}$ = g, 109<br>$Index_{ECCE}$ = k, 110 | $Index_{ECCE}$ = e, 107<br>$Index_{ECCE}$ = f, 108<br>$Index_{ECCE}$ = g, 109<br>$Index_{ECCE}$ = k, 1100 | $Index_{ECCE}$ = e, 107<br>$Index_{ECCE}$ = f, 108<br>$Index_{ECCE}$ = g, 109<br>$Index_{ECCE}$ = k, 110 | $Index_{ECCE}$ = e, 107<br>$Index_{ECCE}$ = f, 108<br>$Index_{ECCE}$ = g, 109<br>$Index_{ECCE}$ = k, 110 |
| 2 | $Index_{ECCE}$ = e, 107<br>$Index_{ECCE}$ = g, 109 | $Index_{ECCE}$ = e, 108<br>$Index_{ECCE}$ = g, 110 | $Index_{ECCE}$ = e, 107<br>$Index_{ECCE}$ = g, 109 | $Index_{ECCE}$ = e, 108<br>$Index_{ECCE}$ = g, 110 |
| 4 | $Index_{ECCE}$ = e, 107 | $Index_{ECCE}$ = e, 109 | $Index_{ECCE}$ = e, 108 | $Index_{ECCE}$ = e, 110 |
| 8 | $Index_{ECCE}$ = e, 109 | $Index_{ECCE}$ = e, 107 | $Index_{ECCE}$ = e, 110 | $Index_{ECCE}$ = e, 108 |
| 16 | $Index_{ECCE}$ = e, 107 | $Index_{ECCE}$ = e, 109 | $Index_{ECCE}$ = e, 108 | $Index_{ECCE}$ = e, 110 |

TABLE 4

| Aggregation level | First localized resource set (or first X value) | | First localized resource set (or second X value) | |
|---|---|---|---|---|
| | First user equipment | Second user equipment | First user equipment | Second user equipment |
| 1 | $Index_{ECCE}$ = e, 107<br>$Index_{ECCE}$ = f, 108<br>$Index_{ECCE}$ = g, 109<br>$Index_{ECCE}$ = k, 110 | $Index_{ECCE}$ = e, 107<br>$Index_{ECCE}$ = f, 108<br>$Index_{ECCE}$ = g, 109<br>$Index_{ECCE}$ = k, 1100 | $Index_{ECCE}$ = e, 107<br>$Index_{ECCE}$ = f, 108<br>$Index_{ECCE}$ = g, 109<br>$Index_{ECCE}$ = k, 110 | $Index_{ECCE}$ = e, 107<br>$Index_{ECCE}$ = f, 108<br>$Index_{ECCE}$ = g, 109<br>$Index_{ECCE}$ = k, 110 |
| 2 | $Index_{ECCE}$ = e, 107<br>$Index_{ECCE}$ = g, 109 | $Index_{ECCE}$ = e, 108<br>$Index_{ECCE}$ = g, 110 | $Index_{ECCE}$ = e, 108<br>$Index_{ECCE}$ = g, 110 | $Index_{ECCE}$ = e, 107<br>$Index_{ECCE}$ = g, 109 |
| 4 | $Index_{ECCE}$ = e, 107 | $Index_{ECCE}$ = e, 108 | $Index_{ECCE}$ = e, 108 | $Index_{ECCE}$ = e, 107 |
| 8 | $Index_{ECCE}$ = e, 109 | $Index_{ECCE}$ = e, 110 | $Index_{ECCE}$ = e, 110 | $Index_{ECCE}$ = e, 109 |
| 16 | $Index_{ECCE}$ = e, 107 | $Index_{ECCE}$ = e, 108 | $Index_{ECCE}$ = e, 108 | $Index_{ECCE}$ = e, 107 |

S405. The base station sends, by using the antenna port, an E-PDCCH or an E-CCE to the user equipment.

Exemplarily, different sending manners may be selected according to different configuration parameters, for example, all E-CCEs in the candidate control channel set are sent to the user equipment by using the antenna port; alternatively, the base station sends all E-CCEs at the preselected aggregation level in the candidate control channel set to the user equipment by using the antenna port, or, sends all E-CCEs in an $m^{th}$ E-PDCCH at the preselected aggregation level in the candidate control channel set to the user equipment by using the antenna port.

It is worth pointing out that the base station and the user equipment use the same method for determining an antenna port. The user equipment performs demodulation and receiving in the same way as the manner of mapping and sending performed by the base station. Therefore, the antenna port used by the base station for sending is consistent with the antenna port used by the user equipment for demodulation and receiving, which is not repeated herein any further.

S406. The base station sends a cell-specific identity and/or a user equipment-specific identity to the user equipment, and/or obtains a sequence number of an RB pair according to a mutually known rule, where the sequence number is preset by the user equipment.

It should be noted that S406 is performed after S403 and there is no order relationship between S406, S404 and S405.

In a control channel resource transmission method provided in this embodiment of the present invention, a user equipment obtains a configuration parameter in a candidate control channel set according to a preset protocol or higher-layer signaling sent by the base station, determines an antenna port according to the configuration parameter, and receives, by using the antenna port, a control channel or a control channel element sent by the base station. The base station uses the same method to determine the antenna port, and sends the control channel or the control channel element to the user equipment by using the antenna port. In this way, different from the prior art, in which the base station needs to use a PDCCH to notify the user equipment to obtain the antenna port, this embodiment of the present invention enables each user equipment to determine, by using a corresponding parameter, the antenna port, and to send and receive the control channel or the control channel element by using the determined antenna port. This ensures that the user equipment can correctly demodulate and receive the control channel or the control channel element sent by the base station.

Figure 5:
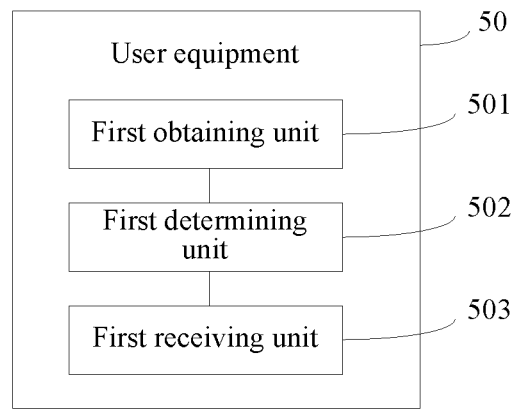
FIG. 5 is a schematic structural diagram of a user equipment according to an embodiment of the present invention.

As shown in FIG. 5, a user equipment 50 provided in an embodiment of the present invention includes:

A first obtaining unit 501 is configured to obtain a configuration parameter in a candidate control channel set according to a preset protocol and/or higher-layer signaling sent by a base station.

The higher-layer signaling is used to notify the configuration parameter.

It should be noted that the preset protocol may be an existing well-known protocol such as an LTE protocol, or a protocol that is newly set according to configuration conditions of the base station and the user equipment. The preset protocol is known to both the base station and the user equipment, and is uniformly determined before resource transmission is performed. In addition, the configuration parameter obtained by the base station is the same as the configuration parameter obtained by the user equipment because the obtaining is according to the mutually known protocol.

A first determining unit 502 is configured to determine an antenna port according to the configuration parameter obtained by the obtaining unit 501.

In an alternative embodiment, for control channels that have a same aggregation level of a same user equipment and have a same start location in a physical resource block PRB pair, the control channels in localized resource sets that have different configurations correspond to different reference signal antenna ports.

In the foregoing alternative embodiment, further, preferably, the localized resource sets that have different configurations include:

sequence numbers or sequence number information of the localized resource sets being different; and/or reference identities of the localized resource sets or scrambling code identities IDs of the localized resource sets being different, where the reference identities are used to generate a demodulation pilot DMRS sequence and the scrambling code identities IDs are used to generate the DMRS sequence.

In the foregoing alternative embodiment, further, preferably, the antenna port is determined by at least one of the following formulas:

$$\text{antenna port} = (\text{Index}_{ECCE} + (X + \text{Index}_{set}) \bmod N) \bmod S + 107,$$

$$\text{antenna port} = (2 \times \text{Index}_{ECCE} + (X + \text{Index}_{set}) \bmod (2 \times N)) \bmod S + 107,$$

$$\text{antenna port} = (\text{Index}_{ECCE} + (X + \log 2(L)) \bmod N) \bmod S + 107,$$

$$\text{antenna port} = (2 \times \text{Index}_{ECCE} + (X + \log 2(L)) \bmod (2 \times N)) \bmod S + 107,$$

$$\text{antenna port} = (\text{Index}_{ECCE} + (X + \text{Index}_{set} + \log 2(L)) \bmod N) \bmod S + 107,$$

$$\text{antenna port} = (2 \times \text{Index}_{ECCE} + (X + \text{Index}_{set} + \log 2(L)) \bmod (2 \times N)) \bmod S + 107,$$

$$\text{antenna port} = (\text{Index}_{ECCE} + (X_1 + X_2) \bmod N) \bmod S + 107,$$

$$\text{antenna port} = (2 \times \text{Index}_{ECCE} + (X_1 + X_2) \bmod (2 \times N)) \bmod S + 107,$$

$$\text{antenna port} = (\text{Index}_{ECCE} + (X_1 + X_2 + \log 2(L)) \bmod N) \bmod S + 107,$$

$$\text{antenna port} = (2 \times \text{Index}_{ECCE} + (X_1 + X_2 + \log 2(L)) \bmod (2 \times N)) \bmod S + 107,$$

$$\text{antenna port} = (\text{Index}_{ECCE} + (X_1 + X_2 + \text{Index}_{set}) \bmod N) \bmod S + 107,$$

$$\text{antenna port} = (2 \times \text{Index}_{ECCE} + (X_1 + X_2 + \text{Index}_{set}) \bmod (2 \times N)) \bmod S + 107,$$

$$\text{antenna port} = (\text{Index}_{ECCE} + (X_1 + X_2 + \text{Index}_{set} + \log 2(L)) \bmod N) \bmod S + 107,$$

$$\text{antenna port} = (2 \times \text{Index}_{ECCE} + (X_1 + X_2 + \text{Index}_{set} + \log 2(L)) \bmod (2 \times N)) \bmod S + 107,$$

$$\text{antenna port} = (\text{Index}_{ECCE} + (Y + \text{ceil}(L/T)) \bmod N) \bmod S + 107, \text{ and}$$

$$\text{antenna port} = (2 \times \text{Index}_{ECCE} + (Y + \text{Index}_{set} + \text{ceil}(L/T)) \bmod (2 \times N)) \bmod S + 107$$

where $\text{Index}_{ECCE}$ is a sequence number or sequence number information of a start control channel element of the control channel in the PRB pair; $\text{Index}_{set}$ is a sequence number or sequence number information of the resource set or a specific parameter of the resource set; $S = 2$ or $4$; $N$ is a quantity of control channel elements occupied by the control channel in the PRB pair; $T$ is a quantity of control channel elements included in a PRB pair; $L$ is an aggregation level; $Y_k$ is an initialization parameter for generating a location of a control channel element corresponding to search space of the control channel; and $X$, $X_1$, and $X_2$ are separately one of the following:

a reference identity for generating the DMRS sequence;
a scrambling code ID for generating the DMRS sequence;
$Y_k$;
a user equipment-specific parameter;
a user equipment-specific identity; and
a radio network temporary identity.

In another alternative embodiment, in a localized resource set, at least two of the control channels that are of different users and whose aggregation level is greater than or equal to Z correspond to different reference signal antenna ports, and a quantity of reference signal antenna ports corresponding to the at least two control channels is smaller than R, where R is a quantity of reference signal antenna ports included in a PRB pair, and Z is a threshold aggregation level.

In the foregoing another alternative embodiment, further, preferably, a quantity of control channel elements included in a PRB pair is 4, a value of Z is 4, and a value of R is 4; and/or a quantity of control channel elements included in a PRB pair is 2, a value of Z is 2, and a value of R is 4.

Preferably, in the foregoing embodiment, the control channel is an enhanced physical downlink control channel E-PDCCH, and the control channel element is an enhanced control channel element E-CCE.

A receiving unit 503 is configured to receive, by using the antenna port determined by the determining unit 502, a control channel or a control channel element sent by a base station 60.

Exemplarily, the receiving unit 503 is configured to receive, by using the antenna port determined by the determining unit 502, an E-PDCCH or an E-CCE sent by the base station 60.

Figure 6:
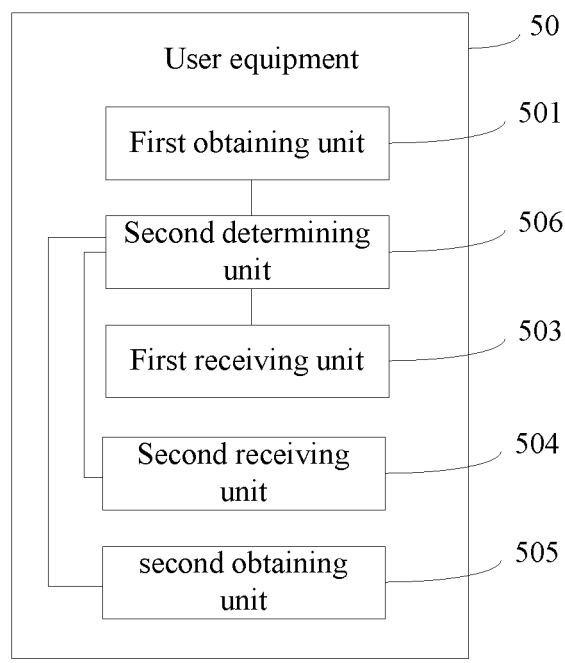
FIG. 6 is a schematic structural diagram of another user equipment according to an embodiment of the present invention.

Further, as shown in FIG. 6, the user equipment 50 further includes:

a receiving unit 504, configured to receive a cell-specific identity and/or a user equipment-specific identity sent by the base station 60;

and/or a second obtaining unit 505, configured to obtain a sequence number of an RB pair according to a rule that is mutually known to the base station, where the sequence number is preset by the user equipment 50.

It should be noted that the receiving unit 504 and the second obtaining unit 505 are arranged depending on whether the user equipment needs to receive a specific identity or obtain an RB pair, and they may coexist or only one of them is arranged, without being limited by the illustration in FIG. 6.

A second determining unit 506 is configured to determine the antenna port according to the configuration parameter obtained by the first obtaining unit 501 and the cell-specific identity and/or the user equipment-specific identity received by the receiving unit 504 and/or the sequence number of the RB pair obtained by the second obtaining unit 505.

It should be noted that, when the user equipment requires the receiving unit 504 and/or the second obtaining unit 505 to work, the user equipment uses the second determining unit 506 to determine an antenna port.

The user equipment 50 may work according to the method provided in the foregoing embodiment, where the working method is the same as the method provided in the embodiment, and is not repeated herein any further.

According to a user equipment provided in this embodiment of the present invention, the user equipment obtains a configuration parameter in a candidate control channel set according to a preset protocol or higher-layer signaling sent by a base station, determines an antenna port according to the configuration parameter, and receives, by using the antenna port, a control channel or a control channel element sent by the base station, and the base station uses the same method to determine the antenna port, and sends the control channel or the control channel element to the user equipment by using the antenna port. In this way, different from the prior art, in which the base station needs to use a PDCCH to notify the user equipment to obtain the antenna port, this embodiment of the present invention enables each user equipment to determine, by using a corresponding parameter, the antenna port, and to send and receive the control channel or the control channel element by using the determined antenna port. This ensures that the user equipment can correctly demodulate and receive the control channel or the control channel element sent by the base station.

Figure 7:
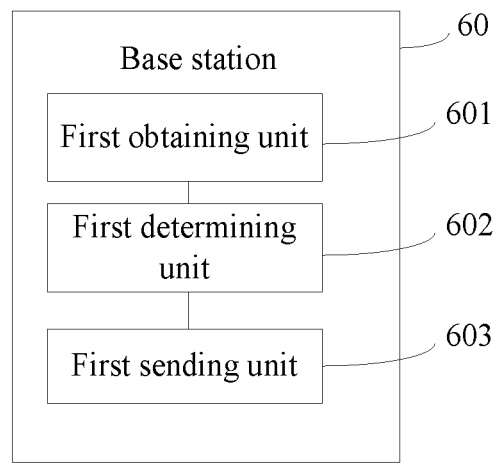
FIG. 7 is a schematic structural diagram of a base station according to an embodiment of the present invention.

As shown in FIG. 7, a base station 60 provided in an embodiment of the present invention includes:

A first obtaining unit 601 is configured to obtain a configuration parameter in a candidate control channel set according to a preset protocol and/or higher-layer signaling sent to a user equipment, where the higher-layer signaling is used to notify the configuration parameter.

A first determining unit 602 is configured to determine an antenna port according to the configuration parameter obtained by the first obtaining unit 601.

In an alternative embodiment, for control channels that have a same aggregation level of a same user equipment and have a same start location in a physical resource block PRB pair, the control channels in localized resource sets that have different configurations correspond to different reference signal antenna ports.

In the foregoing alternative embodiment, further, preferably, the localized resource sets that have different configurations include:

sequence numbers or sequence number information of the localized resource sets being different; and/or reference identities of the localized resource sets or scrambling code identities IDs of the localized resource sets being different, wherein the reference identities are used to generate a demodulation pilot DMRS sequence identity and the scrambling code identities IDs are used to generate the DMRS sequence.

In the foregoing alternative embodiment, further, preferably, the antenna port is determined by at least one of the following formulas:

$$\text{antenna port} = (\text{Index}_{ECCE} + (X + \text{Index}_{set}) \bmod N) \bmod S + 107,$$

$$\text{antenna port} = (2 \times \text{Index}_{ECCE} + (X + \text{Index}_{set}) \bmod (2 \times N)) \bmod S + 107,$$

$$\text{antenna port} = (\text{Index}_{ECCE} + (X + \log 2(L)) \bmod N) \bmod S + 107,$$

$$\text{antenna port} = (2 \times \text{Index}_{ECCE} + (X + \log 2(L)) \bmod (2 \times N)) \bmod S + 107,$$

$$\text{antenna port} = (\text{Index}_{ECCE} + (X + \text{Index}_{set} + \log 2(L)) \bmod N) \bmod S + 107,$$

$$\text{antenna port} = (2 \times \text{Index}_{ECCE} + (X + \text{Index}_{set} + \log 2(L)) \bmod (2 \times N)) \bmod S + 107,$$

$$\text{antenna port} = (\text{Index}_{ECCE} + (X_1 + X_2) \bmod N) \bmod S + 107,$$

$$\text{antenna port} = (2 \times \text{Index}_{ECCE} + (X_1 + X_2) \bmod (2 \times N)) \bmod S + 107,$$

$$\text{antenna port} = (\text{Index}_{ECCE} + (X_1 + X_2 + \log 2(L)) \bmod N) \bmod S + 107,$$

$$\text{antenna port} = (2 \times \text{Index}_{ECCE} + (X_1 + X_2 + \log 2(L)) \bmod (2 \times N)) \bmod S + 107,$$

$$\text{antenna port} = (\text{Index}_{ECCE} + (X_1 + X_2 + \text{Index}_{set}) \bmod N) \bmod S + 107,$$

antenna port=$(2\times\text{Index}_{ECCE}+(X_1+X_2+\text{Index}_{set})\bmod (2\times N))\bmod S+107$, antenna port=$(\text{Index}_{ECCE}+(X_1+X_2+\text{Index}_{set}+\log 2(L))\bmod N)\bmod S+107$, antenna port=$(2\times\text{Index}_{ECCE}+(X_1+X_2+\text{Index}_{set}+\log 2(L))\bmod(2\times N))\bmod S+107$, antenna port=$(\text{Index}_{ECCE}+(Y_k+\text{ceil}(L/T))\bmod N)\bmod S+107$, and antenna port=$(2\times\text{Index}_{ECCE}+(+\text{Index}_{set}+\text{ceil}(L/T))\bmod(2\times N))\bmod S+107$ where $\text{Index}_{ECCE}$ is a sequence number or sequence number information of a start control channel element of the control channel in the PRB pair; $\text{Index}_{set}$ is a sequence number or sequence number information of the resource set or a specific parameter of the resource set; S=2 or 4; N is a quantity of control channel elements occupied by the control channel in the PRB pair; T is a quantity of control channel elements included in a PRB pair; L is an aggregation level; $Y_k$ is an initialization parameter for generating a location of a control channel element corresponding to search space of the control channel; and X, $X_1$, and $X_2$ are separately one of the following:

a reference identity for generating the DMRS sequence;
a scrambling code ID for generating the DMRS sequence;
$Y_k$;
a user equipment-specific parameter;
a user equipment-specific identity; and
a radio network temporary identity.

In another alternative embodiment, in a localized resource set, at least two of the control channels that are of different users and whose aggregation level is greater than or equal to Z correspond to different reference signal antenna ports, and a quantity of reference signal antenna ports corresponding to the at least two control channels is smaller than R, where R is a quantity of reference signal antenna ports included in a PRB pair, and Z is a threshold aggregation level.

In the foregoing another alternative embodiment, further, preferably, a quantity of control channel elements included in a PRB pair is 4, a value of Z is 4, and a value of R is 4; and/or a quantity of control channel elements included in a PRB pair is 2, a value of Z is 2, and a value of R is 4.

In the foregoing embodiment, the control channel is an enhanced physical downlink control channel E-PDCCH, and the control channel element is an enhanced control channel element E-CCE.

Exemplarily, the first determining unit 602 is configured to determine a reference signal antenna port according to a location of a first E-CCE in the search space or the E-PDCCH in the candidate control channel set; or, determine the reference signal antenna port according to an aggregation level L and/or a sequence number m of the E-PDCCH in the search space corresponding to the aggregation level L; or, determine the reference signal antenna port both according to the location of the first E-CCE in the search space or the E-PDCCH in the candidate control channel set and according to the aggregation level L and/or the sequence number m of the E-PDCCH in the search space corresponding to the aggregation level L.

A first sending unit 603 is configured to send, by using the antenna port determined by the first determining unit 602, a control channel or a control channel element to the user equipment 50.

Exemplarily, the first sending unit 603 is configured to send, by using the antenna port determined by the first determining unit 602, an E-PDCCH or an E-CCE to the user equipment 50.

Figure 8:
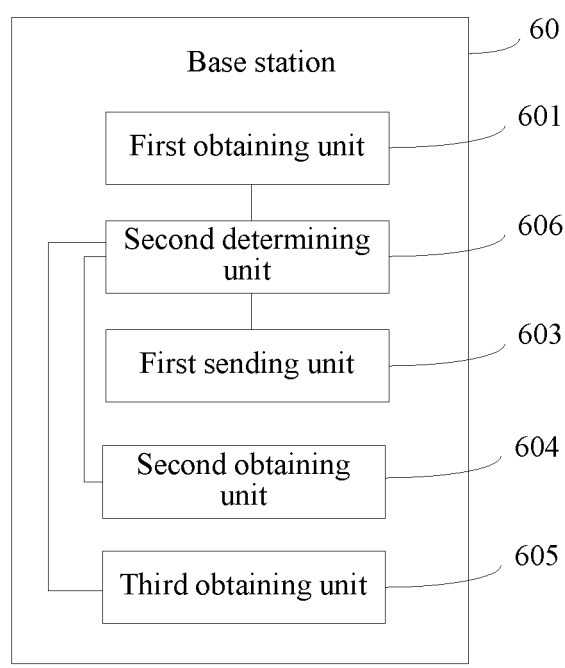
FIG. 8 is a schematic structural diagram of another base station according to an embodiment of the present invention.

Further, as shown in FIG. 8, the base station 60 further includes:

a second obtaining unit 604, configured to obtain a cell-specific identity and/or a user equipment-specific identity according to the user equipment 50; and/or, a third obtaining unit 605, configured to obtain a sequence number of an RB pair according to a rule that is mutually known to the user equipment, where the sequence number is preset by the user equipment 50.

It should be noted that the second obtaining unit 604 and the third obtaining unit 605 are arranged depending on whether the base station 60 needs to receive a specific identity or obtain an RB pair, and they may coexist or only one of them is arranged, without being limited by the illustration in FIG. 8.

The base station 60 further includes:

a second determining unit 606, configured to determine the antenna port according to the configuration parameter obtained by the first obtaining unit 601 and the cell-specific identity and/or the user equipment-specific identity obtained by the second obtaining unit 604 and/or the sequence number of the resource block pair obtained by the third obtaining unit 605.

When the second obtaining unit 604 and/or the third obtaining unit 605 exist and are working, the base station uses the second determining unit 606 to determine the antenna port.

Figure 9:
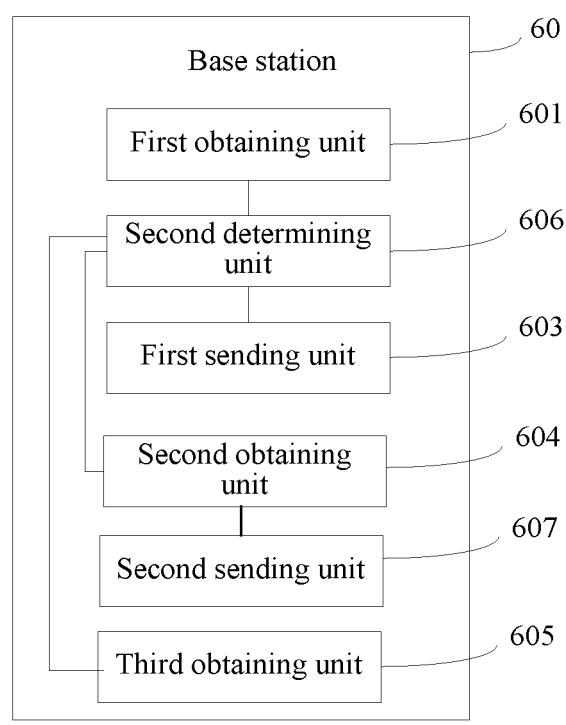
FIG. 9 is a schematic structural diagram of still another base station according to an embodiment of the present invention.

When the base station 60 needs to determine the antenna port by using a specific identity of the user equipment 50, because the user equipment is unable to obtain the specific identity independently, as shown in FIG. 9, the base station 60 further includes:

a second sending unit 607, configured to send the cell-specific identity and/or the user equipment-specific identity obtained by the second obtaining unit 604 to the user equipment 50.

The base station 60 may work according to the method provided in the foregoing embodiment, where the working method is the same as the method provided in the embodiment, and is not repeated herein any further.

According to a base station provided in this embodiment of the present invention, the base station obtains a configuration parameter in a candidate control channel set according to a preset protocol or by sending higher-layer signaling to a user, determines an antenna port according to the configuration parameter, and sends, by using the antenna port, a control channel or a control channel element to a user equipment. In this way, different from the prior art, in which the base station needs to use a PDCCH to notify the user equipment to obtain the antenna port, this embodiment of the present invention enables each user equipment to determine, by using a corresponding parameter, the antenna port, and to send and receive the control channel or the control channel element by using the determined antenna port. This ensures that the user equipment can correctly demodulate and receive the control channel or the control channel element sent by the base station.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
    determining, by a terminal device for a $m^{th}$ candidate control channel in a search space, an index of an antenna port based on an identity of the terminal device and a configuration parameter of a candidate control channel set associated with the search space,
        wherein the configuration parameter comprises an aggregation level of the search space and a sequence number of the $1^{st}$ control channel element of the $m^{th}$ candidate control channel; and
    receiving, by the terminal device, the $m^{th}$ candidate control channel by using the antenna port identified by the index.

2. The method according to claim 1, wherein the identity of the terminal device is a radio network temporary identity (RNTI).

3. The method according to claim 1, wherein determining the index of the antenna port comprises:
    determining, by the terminal device for the $m^{th}$ candidate control channel in the search space, the index of the antenna port based on the identity of the terminal device, the aggregation level of the search space, the sequence number of the $1^{st}$ control channel element of the $m^{th}$ candidate control channel, and a predefined mapping relationship among the index of the antenna port, the identity of the terminal device, the aggregation level of the search space, and the sequence number of the $1^{st}$ control channel element of the $m^{th}$ candidate control channel.

4. The method according to claim 1, wherein determining the index of the antenna port comprises:
    determining, by the terminal device for the $m^{th}$ candidate control channel in the search space, the index of the antenna port based on a function whose input parameters comprise the identity of the terminal device, the aggregation level of the search space, and the sequence number of the $1^{st}$ control channel element of the $m^{th}$ candidate control channel.

5. The method according to claim 1, further comprising:
    receiving, by the terminal device from the base station, the identity of the terminal device.

6. An apparatus in a terminal device, the apparatus comprising:
    a memory having executable instructions stored thereon; and
    a processor coupled to the storage medium and configured to execute the executable instructions to:
        determine, for a $m^{th}$ candidate control channel in a search space, an index of an antenna port based on an identity of the terminal device and a configuration parameter of a candidate control channel set associated with the search space,
            wherein the configuration parameter comprises an aggregation level of the search space and a sequence number of the $1^{st}$ control channel element of the $m^{th}$ candidate control channel; and
        receive the $m^{th}$ candidate control channel by using the antenna port identified by the index.

7. The apparatus according to claim 6, wherein the identity of the terminal device is a radio network temporary identity (RNTI).

8. The apparatus according to claim 6, wherein determining the index of the antenna port comprises:
    determining, for the $m^{th}$ candidate control channel in the search space, the index of the antenna port based on the identity of the terminal device, the aggregation level of the search space, the sequence number of the $1^{st}$ control channel element of the $m^{th}$ candidate control channel, and a predefined mapping relationship among the index of the antenna port, the identity of the terminal device, the aggregation level of the search space, and the sequence number of the $1^{st}$ control channel element of the $m^{th}$ candidate control channel.

9. The apparatus according to claim 6, wherein determining the index of the antenna port comprises:
    determining, for the $m^{th}$ candidate control channel in the search space, the index of the antenna port based on a function whose input parameters comprise the identity of the terminal device, the aggregation level of the search space, and the sequence number of the $1^{st}$ control channel element of the $m^{th}$ candidate control channel.

10. The apparatus according to claim 6, wherein the executable instructions, when executed by the processor, further causes the terminal device to receive the identity of the terminal device.

11. A terminal device comprising:
    a processor configured to determine, for a $m^{th}$ candidate control channel in a search space, an index of an antenna port based on an identity of the terminal device and a configuration parameter of a candidate control channel set associated with the search space,
        wherein the configuration parameter comprises an aggregation level of the search space and a sequence number of the $1^{st}$ control channel element of the $m^{th}$ candidate control channel; and
    a receiver configured to cooperate with the processor to receive the $m^{th}$ candidate control channel by using the antenna port identified by the index.

12. The terminal device according to claim 11, wherein the identity of the terminal device is a radio network temporary identity (RNTI).

13. The terminal device according to claim 11, wherein determining the index of the antenna port comprises:
    determining, for the $m^{th}$ candidate control channel in the search space, the index of the antenna port based on the identity of the terminal device, the aggregation level of the search space, the sequence number of the $1^{st}$ control channel element of the $m^{th}$ candidate control channel, and a predefined mapping relationship among the index of the antenna port, the identity of the terminal device, the aggregation level of the search space, and the sequence number of the $1^{st}$ control channel element of the $m^{th}$ candidate control channel.

14. The terminal device according to claim 11, wherein determining the index of the antenna port comprises:
    determining, for the $m^{th}$ candidate control channel in the search space, the index of the antenna port based on a function whose input parameters comprise the identity of the terminal device, the aggregation level of the search space, and the sequence number of the $1^{st}$ control channel element of the $m^{th}$ candidate control channel.

15. The terminal device according to claim 11, wherein the receiver is further configured to cooperate with the processor to receive the identity of the terminal device.

16. A method comprising:
determining, by a base station for a $m^{th}$ candidate control channel in a search space, an index of an antenna port based on an identity of a terminal device and a configuration parameter of a candidate control channel set associated with the search space,
  wherein the configuration parameter comprises an aggregation level of the search space and a sequence number of the $1^{st}$ control channel element of the $m^{th}$ candidate control channel; and
sending, by the base station, the $m^{th}$ candidate control channel by using the antenna port identified by the index.

17. The method according to claim 16, wherein the identity of the terminal device is a radio network temporary identity (RNTI).

18. The method according to claim 16, wherein determining the index of the antenna port comprises:
determining, by the base station for the $m^{th}$ candidate control channel in the search space, the index of the antenna port based on a function whose input parameters comprise the identity of the terminal device, the aggregation level of the search space, and the sequence number of the $1^{st}$ control channel element of the $m^{th}$ candidate control channel.

19. An apparatus comprising:
a memory having executable instructions stored thereon; and
a processor coupled to the storage medium and configured to execute the executable instructions to:
  determine, for $m^{th}$ candidate control channel in a search space, an index of an antenna port based on an identity of a terminal device and a configuration parameter of a candidate control channel set associated with the search space,
    wherein the configuration parameter comprises an aggregation level of the search space and a sequence number of the $1^{st}$ control channel element of the $m^{th}$ candidate control channel; and
  send the $m^{th}$ candidate control channel by using the antenna port identified by the index.

20. The apparatus according to claim 19, wherein determining the index of the antenna port comprises:
determining, for the $m^{th}$ candidate control channel in the search space, the index of the antenna port based on a function whose input parameters comprise the identity of the terminal device, the aggregation level of the search space, and the sequence number of the $1^{st}$ control channel element of the $m^{th}$ candidate control channel.

* * * * *

UNITED STATES PATENT AND TRADEMARK OFFICE
CERTIFICATE OF CORRECTION

PATENT NO. : 11,039,432 B2
APPLICATION NO. : 16/855156
DATED : June 15, 2021
INVENTOR(S) : Xia et al.

Page 1 of 1

It is certified that error appears in the above-identified patent and that said Letters Patent is hereby corrected as shown below:

In the Claims

Claim 19: Column 32, Line 9: "determine, for $m^{th}$ candidate control channel in a search" should read -- determine, for a $m^{th}$ candidate control channel in a search --.

Signed and Sealed this
Thirteenth Day of September, 2022

Katherine Kelly Vidal
*Director of the United States Patent and Trademark Office*